(12) United States Patent
Probst et al.

(10) Patent No.: US 9,632,223 B2
(45) Date of Patent: Apr. 25, 2017

(54) WIRE GRID POLARIZER WITH SIDE REGION

(71) Applicant: Moxtek, Inc., Orem, UT (US)

(72) Inventors: Dean Probst, West Jordan, UT (US); Qihong Wu, Campsie (AU); Eric Gardner, Eagle Mountain, UT (US); Mark Alan Davis, Springville, UT (US)

(73) Assignee: Moxtek, Inc., Orem, UT (US)

( * ) Notice: Subject to any disclaimer, the term of this patent is extended or adjusted under 35 U.S.C. 154(b) by 303 days.

(21) Appl. No.: 14/470,351

(22) Filed: Aug. 27, 2014

(65) Prior Publication Data

US 2015/0131150 A1    May 14, 2015

Related U.S. Application Data

(60) Provisional application No. 61/924,569, filed on Jan. 7, 2014, provisional application No. 61/924,560, filed on Jan. 7, 2014, provisional application No. 61/895,225, filed on Oct. 24, 2013.

(51) Int. Cl.
| | | |
|---|---|---|
| *G02B 5/30* | (2006.01) | |
| *G02B 1/12* | (2006.01) | |
| *G02B 1/08* | (2006.01) | |
| *C23F 17/00* | (2006.01) | |

(52) U.S. Cl.
CPC ............ *G02B 5/3058* (2013.01); *C23F 17/00* (2013.01); *G02B 1/08* (2013.01); *G02B 1/12* (2013.01)

(58) Field of Classification Search
CPC ................................ G02B 5/3058; G02B 1/08

USPC .......................................... 359/485.05, 487.03
See application file for complete search history.

(56) References Cited

U.S. PATENT DOCUMENTS

| 2,224,214 | A | 12/1940 | Brown |
| 2,237,567 | A | 4/1941 | Land |
| 2,287,598 | A | 6/1942 | Brown |
| 2,391,451 | A | 12/1945 | Fischer |
| 2,403,731 | A | 7/1946 | MacNeille |
| 2,605,352 | A | 7/1952 | Fischer |
| 2,748,659 | A | 6/1956 | Geffcken et al. |
| 2,813,146 | A | 11/1957 | Glenn |
| 2,815,452 | A | 12/1957 | Mertz |

(Continued)

FOREIGN PATENT DOCUMENTS

| CN | 1438544 A | 8/2003 |
| CN | 1692291 | 11/2005 |

(Continued)

OTHER PUBLICATIONS

Auton et al.; "Grid Polarizers for Use in the Near Infrared." Infrared Physics, 1972, vol. 12, pp. 95-100.

(Continued)

*Primary Examiner* — Ricky D Shafer
(74) *Attorney, Agent, or Firm* — Thorpe, North & Western, LLP

(57) ABSTRACT

Structures and methods of making wire grid polarizers having multiple regions, including side bars, strips, and/or side ribs along sides of a central region. The central region can include a single region or multiple regions. Each region can have a different function for improving polarizer performance. The various regions can support each other for improved wire grid polarizer durability.

12 Claims, 10 Drawing Sheets

(56) References Cited

U.S. PATENT DOCUMENTS

| | | |
|---|---|---|
| 2,887,566 A | 5/1959 | Marks |
| 3,046,839 A | 7/1962 | Bird et al. |
| 3,084,590 A | 4/1963 | Glenn, Jr. |
| 3,202,039 A | 8/1965 | Lang et al. |
| 3,213,753 A | 10/1965 | Rogers |
| 3,235,630 A | 2/1966 | Doherty et al. |
| 3,291,550 A | 12/1966 | Bird et al. |
| 3,291,871 A | 12/1966 | Francis |
| 3,293,331 A | 12/1966 | Doherty |
| 3,436,143 A | 4/1969 | Garrett |
| 3,479,168 A | 11/1969 | Bird et al. |
| 3,536,373 A | 10/1970 | Bird et al. |
| 3,566,099 A | 2/1971 | Makas |
| 3,627,431 A | 12/1971 | Komarniski |
| 3,631,288 A | 12/1971 | Rogers |
| 3,653,741 A | 4/1972 | Marks |
| 3,731,986 A | 5/1973 | Fergason |
| 3,857,627 A | 12/1974 | Harsch |
| 3,857,628 A | 12/1974 | Strong |
| 3,876,285 A | 4/1975 | Schwarzmüller |
| 3,877,789 A | 4/1975 | Marie |
| 3,912,369 A | 10/1975 | Kashnow |
| 3,969,545 A | 7/1976 | Slocum |
| 4,009,933 A | 3/1977 | Firester |
| 4,025,164 A | 5/1977 | Doriguzzi et al. |
| 4,025,688 A | 5/1977 | Nagy et al. |
| 4,049,944 A | 9/1977 | Garvin et al. |
| 4,068,260 A | 1/1978 | Ohneda et al. |
| 4,073,571 A | 2/1978 | Grinberg et al. |
| 4,104,598 A | 8/1978 | Abrams |
| 4,181,756 A | 1/1980 | Fergason |
| 4,220,705 A | 9/1980 | Sugibuchi et al. |
| 4,221,464 A | 9/1980 | Pedinoff et al. |
| 4,268,127 A | 5/1981 | Oshima et al. |
| 4,289,381 A | 9/1981 | Garvin et al. |
| 4,294,119 A | 10/1981 | Soldner |
| 4,308,079 A | 12/1981 | Venables et al. |
| 4,441,791 A | 4/1984 | Hornbeck |
| 4,456,515 A | 6/1984 | Krueger et al. |
| 4,466,704 A | 8/1984 | Schuler et al. |
| 4,492,432 A | 1/1985 | Kaufmann et al. |
| 4,512,638 A | 4/1985 | Sriram et al. |
| 4,514,479 A | 4/1985 | Ferrante |
| 4,515,441 A | 5/1985 | Wentz |
| 4,515,443 A | 5/1985 | Bly |
| 4,532,619 A | 7/1985 | Sugiyama et al. |
| 4,560,599 A | 12/1985 | Regen |
| 4,679,910 A | 7/1987 | Efron et al. |
| 4,688,897 A | 8/1987 | Grinberg et al. |
| 4,701,028 A | 10/1987 | Clerc et al. |
| 4,711,530 A | 12/1987 | Nakanowatari et al. |
| 4,712,881 A | 12/1987 | Shurtz, II et al. |
| 4,724,436 A | 2/1988 | Johansen et al. |
| 4,743,092 A | 5/1988 | Pistor |
| 4,743,093 A | 5/1988 | Oinen |
| 4,759,611 A | 7/1988 | Downey, Jr. |
| 4,759,612 A | 7/1988 | Nakatsuka et al. |
| 4,763,972 A | 8/1988 | Papuchon et al. |
| 4,795,233 A | 1/1989 | Chang |
| 4,799,776 A | 1/1989 | Yamazaki et al. |
| 4,818,076 A | 4/1989 | Heppke et al. |
| 4,840,757 A | 6/1989 | Blenkhorn |
| 4,865,670 A | 9/1989 | Marks |
| 4,870,649 A | 9/1989 | Bobeck et al. |
| 4,893,905 A | 1/1990 | Efron et al. |
| 4,895,769 A | 1/1990 | Land et al. |
| 4,904,060 A | 2/1990 | Grupp |
| 4,913,529 A | 4/1990 | Goldenberg et al. |
| 4,915,463 A | 4/1990 | Barbee, Jr. |
| 4,939,526 A | 7/1990 | Tsuda |
| 4,946,231 A | 8/1990 | Pistor |
| 4,966,438 A | 10/1990 | Mouchart et al. |
| 4,974,941 A | 12/1990 | Gibbons et al. |
| 4,991,937 A | 2/1991 | Urino |
| 5,029,988 A | 7/1991 | Urino |
| 5,039,185 A | 8/1991 | Uchida et al. |
| 5,061,050 A | 10/1991 | Ogura |
| 5,087,985 A | 2/1992 | Kitaura et al. |
| 5,092,774 A | 3/1992 | Milan |
| 5,113,285 A | 5/1992 | Franklin et al. |
| 5,115,305 A | 5/1992 | Baur |
| 5,122,887 A | 6/1992 | Mathewson |
| 5,122,907 A | 6/1992 | Slocum |
| 5,124,841 A | 6/1992 | Oishi |
| 5,139,340 A | 8/1992 | Okumura |
| 5,157,526 A | 10/1992 | Kondo et al. |
| 5,163,877 A | 11/1992 | Marpert et al. |
| 5,177,635 A | 1/1993 | Keilmann |
| 5,196,926 A | 3/1993 | Lee |
| 5,196,953 A | 3/1993 | Yeh et al. |
| 5,198,921 A | 3/1993 | Aoshima et al. |
| 5,204,765 A | 4/1993 | Mitsui et al. |
| 5,206,674 A | 4/1993 | Puech et al. |
| 5,216,539 A | 6/1993 | Boher et al. |
| 5,222,907 A | 6/1993 | Katabuchi et al. |
| 5,225,920 A | 7/1993 | Kasazumi et al. |
| 5,235,443 A | 8/1993 | Barnik et al. |
| 5,235,449 A | 8/1993 | Imazeki et al. |
| 5,239,322 A | 8/1993 | Takanashi et al. |
| 5,245,471 A | 9/1993 | Iwatsuka et al. |
| 5,267,029 A | 11/1993 | Kurematsu |
| 5,279,689 A | 1/1994 | Shvartsman |
| 5,295,009 A | 3/1994 | Barnik et al. |
| 5,298,199 A | 3/1994 | Hirose et al. |
| 5,305,143 A | 4/1994 | Taga et al. |
| 5,325,218 A | 6/1994 | Willett et al. |
| 5,333,072 A | 7/1994 | Willett |
| 5,349,192 A | 9/1994 | Mackay |
| 5,357,370 A | 10/1994 | Miyatake et al. |
| 5,383,053 A | 1/1995 | Hegg et al. |
| 5,387,953 A | 2/1995 | Minoura et al. |
| 5,391,091 A | 2/1995 | Nations |
| 5,401,587 A | 3/1995 | Motohiro et al. |
| 5,422,756 A | 6/1995 | Weber |
| 5,430,573 A | 7/1995 | Araujo et al. |
| 5,436,761 A | 7/1995 | Kamon |
| 5,455,589 A | 10/1995 | Huguenin et al. |
| 5,466,319 A | 11/1995 | Zager et al. |
| 5,477,359 A | 12/1995 | Okazaki |
| 5,485,499 A | 1/1996 | Pew et al. |
| 5,486,935 A | 1/1996 | Kalmanash |
| 5,486,949 A | 1/1996 | Schrenk et al. |
| 5,490,003 A | 2/1996 | Van Sprang |
| 5,499,126 A | 3/1996 | Abileah et al. |
| 5,504,603 A | 4/1996 | Winker et al. |
| 5,506,704 A | 4/1996 | Broer et al. |
| 5,508,830 A | 4/1996 | Imoto et al. |
| 5,510,215 A | 4/1996 | Prince et al. |
| 5,513,023 A | 4/1996 | Fritz et al. |
| 5,513,035 A | 4/1996 | Miyatake et al. |
| 5,517,356 A | 5/1996 | Araujo et al. |
| 5,535,047 A | 7/1996 | Hornbeck |
| 5,548,427 A | 8/1996 | May |
| 5,555,186 A | 9/1996 | Shioya |
| 5,557,343 A | 9/1996 | Yamagishi |
| 5,559,634 A | 9/1996 | Weber |
| 5,570,213 A | 10/1996 | Ruiz et al. |
| 5,570,215 A | 10/1996 | Omae et al. |
| 5,574,580 A | 11/1996 | Ansley |
| 5,576,854 A | 11/1996 | Schmidt et al. |
| 5,579,138 A | 11/1996 | Sannohe et al. |
| 5,594,561 A | 1/1997 | Blanchard |
| 5,599,551 A | 2/1997 | Kelly |
| 5,600,383 A | 2/1997 | Hornbeck |
| 5,602,661 A | 2/1997 | Schadt et al. |
| 5,609,939 A | 3/1997 | Petersen et al. |
| 5,612,820 A | 3/1997 | Schrenk et al. |
| 5,614,035 A | 3/1997 | Nadkarni |
| 5,619,356 A | 4/1997 | Kozo et al. |
| 5,620,755 A | 4/1997 | Smith, Jr. et al. |
| 5,626,408 A | 5/1997 | Heynderickx et al. |
| 5,638,197 A | 6/1997 | Gunning, III et al. |
| 5,652,667 A | 7/1997 | Kurogane |
| 5,658,060 A | 8/1997 | Dove |

(56) References Cited

U.S. PATENT DOCUMENTS

| | | |
|---|---|---|
| 5,686,979 A | 11/1997 | Weber et al. |
| 5,706,063 A | 1/1998 | Hong |
| 5,706,131 A | 1/1998 | Ichimura et al. |
| 5,719,695 A | 2/1998 | Heimbuch |
| 5,731,246 A | 3/1998 | Bakeman et al. |
| 5,748,368 A | 5/1998 | Tamada et al. |
| 5,748,369 A | 5/1998 | Yokota |
| 5,751,388 A | 5/1998 | Larson |
| 5,751,466 A | 5/1998 | Dowling et al. |
| 5,767,827 A | 6/1998 | Kobaysashi et al. |
| 5,798,819 A | 8/1998 | Hattori et al. |
| 5,808,795 A | 9/1998 | Shimomura et al. |
| 5,826,959 A | 10/1998 | Atsuchi |
| 5,826,960 A | 10/1998 | Gotoh et al. |
| 5,828,489 A | 10/1998 | Johnson et al. |
| 5,833,360 A | 11/1998 | Knox et al. |
| 5,838,403 A | 11/1998 | Jannson et al. |
| 5,841,494 A | 11/1998 | Hall |
| 5,844,722 A | 12/1998 | Stephens et al. |
| 5,864,427 A | 1/1999 | Fukano et al. |
| 5,886,754 A | 3/1999 | Kuo |
| 5,890,095 A | 3/1999 | Barbour et al. |
| 5,898,521 A | 4/1999 | Okada |
| 5,899,551 A | 5/1999 | Neijzen et al. |
| 5,900,976 A | 5/1999 | Handschy et al. |
| 5,907,427 A | 5/1999 | Scalora et al. |
| 5,912,762 A | 6/1999 | Li et al. |
| 5,914,818 A | 6/1999 | Tejada et al. |
| 5,917,562 A | 6/1999 | Woodgate et al. |
| 5,918,961 A | 7/1999 | Ueda |
| 5,930,050 A | 7/1999 | Dewald |
| 5,943,171 A | 8/1999 | Budd et al. |
| 5,958,345 A | 9/1999 | Turner et al. |
| 5,965,247 A | 10/1999 | Jonza et al. |
| 5,969,861 A | 10/1999 | Ueda et al. |
| 5,973,833 A | 10/1999 | Booth et al. |
| 5,978,056 A | 11/1999 | Shintani et al. |
| 5,982,541 A | 11/1999 | Li et al. |
| 5,986,730 A | 11/1999 | Hansen et al. |
| 5,991,075 A | 11/1999 | Katsuragawa et al. |
| 5,991,077 A | 11/1999 | Carlson et al. |
| 6,005,918 A | 12/1999 | Harris et al. |
| 6,008,871 A | 12/1999 | Okumura |
| 6,008,951 A | 12/1999 | Anderson |
| 6,010,121 A | 1/2000 | Lee |
| 6,016,173 A | 1/2000 | Crandall |
| 6,018,841 A | 2/2000 | Kelsay et al. |
| 6,046,851 A | 4/2000 | Katayama |
| 6,049,428 A | 4/2000 | Khan et al. |
| 6,053,616 A | 4/2000 | Fujimori et al. |
| 6,055,103 A | 4/2000 | Woodgate et al. |
| 6,055,215 A | 4/2000 | Katsuragawa |
| 6,056,407 A | 5/2000 | Iinuma et al. |
| 6,062,694 A | 5/2000 | Oikawa et al. |
| 6,075,235 A | 6/2000 | Chun |
| 6,081,312 A | 6/2000 | Aminaka et al. |
| 6,081,376 A | 6/2000 | Hansen et al. |
| 6,082,861 A | 7/2000 | Dove et al. |
| 6,089,717 A | 7/2000 | Iwai |
| 6,096,155 A | 8/2000 | Harden et al. |
| 6,096,375 A | 8/2000 | Ouderkirk et al. |
| 6,100,928 A | 8/2000 | Hata |
| 6,108,131 A | 8/2000 | Hansen et al. |
| 6,122,103 A | 9/2000 | Perkins et al. |
| 6,122,403 A | 9/2000 | Rhoads |
| 6,124,971 A | 9/2000 | Ouderkirk et al. |
| 6,141,075 A | 10/2000 | Ohmuro et al. |
| 6,147,728 A | 11/2000 | Okumura et al. |
| 6,172,813 B1 | 1/2001 | Tadic-Galeb et al. |
| 6,172,816 B1 | 1/2001 | Tadic-Galeb et al. |
| 6,181,386 B1 | 1/2001 | Knox |
| 6,181,458 B1 | 1/2001 | Brazas, Jr. et al. |
| 6,185,041 B1 | 2/2001 | TadicGaleb et al. |
| 6,208,463 B1 | 3/2001 | Hansen et al. |
| 6,215,547 B1 | 4/2001 | Ramanujan et al. |
| 6,234,634 B1 | 5/2001 | Hansen et al. |
| 6,243,199 B1 | 6/2001 | Hansen et al. |
| 6,247,816 B1 | 6/2001 | Cipolla et al. |
| 6,249,378 B1 | 6/2001 | Shimamura et al. |
| 6,250,762 B1 | 6/2001 | Kuijper |
| 6,251,297 B1 | 6/2001 | Komuro et al. |
| 6,282,025 B1 | 8/2001 | Huang et al. |
| 6,288,840 B1 | 9/2001 | Perkins et al. |
| 6,291,797 B1 | 9/2001 | Koyama et al. |
| 6,310,345 B1 | 10/2001 | Pittman et al. |
| 6,339,454 B1 | 1/2002 | Knox |
| 6,340,230 B1 | 1/2002 | Bryars et al. |
| 6,345,895 B1 | 2/2002 | Maki et al. |
| 6,348,995 B1 | 2/2002 | Hansen et al. |
| 6,375,330 B1 | 4/2002 | Mihalakis |
| 6,390,626 B2 | 5/2002 | Knox |
| 6,398,364 B1 | 6/2002 | Bryars |
| 6,406,151 B1 | 6/2002 | Fujimori |
| 6,409,525 B1 | 6/2002 | Hoelscher et al. |
| 6,411,749 B2 | 6/2002 | Teng et al. |
| 6,424,436 B1 | 7/2002 | Yamanaka |
| 6,426,837 B1 | 7/2002 | Clark et al. |
| 6,447,120 B1 | 9/2002 | Hansen et al. |
| 6,452,724 B1 | 9/2002 | Hansen et al. |
| 6,460,998 B1 | 10/2002 | Watanabe |
| 6,473,236 B2 | 10/2002 | Tadic-Galeb et al. |
| 6,486,997 B1 | 11/2002 | Bruzzone et al. |
| 6,490,017 B1 | 12/2002 | Huang et al. |
| 6,496,239 B2 | 12/2002 | Seiberle |
| 6,496,287 B1 | 12/2002 | Seiberle et al. |
| 6,511,183 B2 | 1/2003 | Shimizu et al. |
| 6,514,674 B1 | 2/2003 | Iwasaki |
| 6,520,645 B2 | 2/2003 | Yamamoto et al. |
| 6,532,111 B2 | 3/2003 | Kurtz et al. |
| 6,547,396 B1 | 4/2003 | Svardal et al. |
| 6,580,471 B2 | 6/2003 | Knox |
| 6,583,930 B1 | 6/2003 | Schrenk et al. |
| 6,585,378 B2 | 7/2003 | Kurtz et al. |
| 6,624,936 B2 | 9/2003 | Kotchick et al. |
| 6,643,077 B2 | 11/2003 | Magarill et al. |
| 6,654,168 B1 | 11/2003 | Borrelli |
| 6,661,475 B1 | 12/2003 | Stahl et al. |
| 6,661,484 B1 | 12/2003 | Iwai et al. |
| 6,665,119 B1 | 12/2003 | Kurtz et al. |
| 6,666,556 B2 | 12/2003 | Hansen et al. |
| 6,669,343 B2 | 12/2003 | Shahzad et al. |
| 6,698,891 B2 | 3/2004 | Kato |
| 6,704,469 B1 | 3/2004 | Xie et al. |
| 6,710,921 B2 | 3/2004 | Hansen et al. |
| 6,714,350 B2 | 3/2004 | Silverstein et al. |
| 6,721,096 B2 | 4/2004 | Bruzzone et al. |
| 6,739,723 B1 | 5/2004 | Haven et al. |
| 6,746,122 B2 | 6/2004 | Knox |
| 6,764,181 B2 | 7/2004 | Magarill et al. |
| 6,769,779 B1 | 8/2004 | Ehrne et al. |
| 6,781,640 B1 | 8/2004 | Huang |
| 6,785,050 B2 | 8/2004 | Lines et al. |
| 6,788,461 B2 | 9/2004 | Kurtz et al. |
| 6,805,445 B2 | 10/2004 | Silverstein et al. |
| 6,809,864 B2 | 10/2004 | Martynov et al. |
| 6,809,873 B2 | 10/2004 | Cobb |
| 6,811,274 B2 | 11/2004 | Olczak |
| 6,813,077 B2 | 11/2004 | Borrelli et al. |
| 6,816,290 B2 | 11/2004 | Mukawa |
| 6,821,135 B1 | 11/2004 | Martin |
| 6,823,093 B2 | 11/2004 | Chang et al. |
| 6,829,090 B2 | 12/2004 | Katsumata et al. |
| 6,844,971 B2 | 1/2005 | Silverstein et al. |
| 6,846,089 B2 | 1/2005 | Stevenson et al. |
| 6,859,303 B2 | 2/2005 | Wang et al. |
| 6,876,784 B2 | 4/2005 | Nikolov et al. |
| 6,896,371 B2 | 5/2005 | Shimizu et al. |
| 6,897,926 B2 | 5/2005 | Mi et al. |
| 6,899,440 B2 | 5/2005 | Bierhuizen |
| 6,900,866 B2 | 5/2005 | Kurtz et al. |
| 6,909,473 B2 | 6/2005 | Mi et al. |
| 6,920,272 B2 | 7/2005 | Wang |
| 6,922,287 B2 | 7/2005 | Wiki et al. |
| 6,926,410 B2 | 8/2005 | Weber et al. |

(56) References Cited

U.S. PATENT DOCUMENTS

| | | |
|---|---|---|
| 6,927,915 B2 | 8/2005 | Nakai |
| 6,934,082 B2 | 8/2005 | Allen et al. |
| 6,943,941 B2 | 9/2005 | Flagello et al. |
| 6,947,215 B2 | 9/2005 | Hoshi |
| 6,954,245 B2 | 10/2005 | Mi et al. |
| 6,972,906 B2 | 12/2005 | Hasman et al. |
| 6,976,759 B2 | 12/2005 | Magarill et al. |
| 6,981,771 B1 | 1/2006 | Arai et al. |
| 7,009,768 B2 | 3/2006 | Sakamoto |
| 7,013,064 B2 | 3/2006 | Wang |
| 7,023,512 B2 | 4/2006 | Kurtz et al. |
| 7,023,602 B2 | 4/2006 | Aastuen et al. |
| 7,025,464 B2 | 4/2006 | Beeson et al. |
| 7,026,046 B2 | 4/2006 | Edlinger et al. |
| 7,046,422 B2 | 5/2006 | Kimura et al. |
| 7,046,441 B2 | 5/2006 | Huang et al. |
| 7,046,442 B2 | 5/2006 | Suganuma |
| 7,050,233 B2 | 5/2006 | Nikolov et al. |
| 7,050,234 B2 | 5/2006 | Gage et al. |
| 7,075,602 B2 | 7/2006 | Sugiura et al. |
| 7,075,722 B2 | 7/2006 | Nakai |
| 7,085,050 B2 | 8/2006 | Florence |
| 7,099,068 B2 | 8/2006 | Wang et al. |
| 7,113,335 B2 | 9/2006 | Sales |
| 7,116,478 B2 | 10/2006 | Momoki et al. |
| 7,129,183 B2 | 10/2006 | Mori et al. |
| 7,131,737 B2 | 11/2006 | Silverstein et al. |
| 7,142,363 B2 | 11/2006 | Sato et al. |
| 7,142,375 B2 | 11/2006 | Nikolov et al. |
| 7,155,073 B2 | 12/2006 | Momoki et al. |
| 7,158,302 B2 | 1/2007 | Chiu et al. |
| 7,159,987 B2 | 1/2007 | Sakata |
| 7,177,259 B2 | 2/2007 | Nishi et al. |
| 7,184,115 B2 | 2/2007 | Mi et al. |
| 7,185,984 B2 | 3/2007 | Akiyama |
| 7,203,001 B2 | 4/2007 | Deng et al. |
| 7,213,920 B2 | 5/2007 | Matsui et al. |
| 7,220,371 B2 | 5/2007 | Suganuma |
| 7,221,420 B2 | 5/2007 | Silverstein et al. |
| 7,221,501 B2 | 5/2007 | Flagello et al. |
| 7,227,684 B2 | 6/2007 | Wang et al. |
| 7,230,766 B2 | 6/2007 | Rogers |
| 7,234,816 B2 | 6/2007 | Bruzzone et al. |
| 7,236,655 B2 | 6/2007 | Momoki et al. |
| 7,255,444 B2 | 8/2007 | Nakashima et al. |
| 7,256,938 B2 | 8/2007 | Barton et al. |
| 7,268,946 B2 | 9/2007 | Wang |
| 7,297,386 B2 | 11/2007 | Suzuki et al. |
| 7,298,475 B2 | 11/2007 | Gandhi et al. |
| 7,306,338 B2 | 12/2007 | Hansen et al. |
| 7,375,887 B2 | 5/2008 | Hansen |
| 7,414,784 B2 | 8/2008 | Mi et al. |
| 7,466,484 B2 | 12/2008 | Mi et al. |
| 7,545,564 B2 | 6/2009 | Wang |
| 7,561,332 B2 | 7/2009 | Little et al. |
| 7,570,424 B2 | 8/2009 | Perkins et al. |
| 7,619,816 B2 | 11/2009 | Deng et al. |
| 7,630,133 B2 | 12/2009 | Perkins |
| 7,670,758 B2 | 3/2010 | Wang et al. |
| 7,692,860 B2 | 4/2010 | Sato et al. |
| 7,722,194 B2 | 5/2010 | Amako et al. |
| 7,755,718 B2 | 7/2010 | Amako et al. |
| 7,789,515 B2 | 9/2010 | Hansen |
| 7,800,823 B2 | 9/2010 | Perkins |
| 7,813,039 B2 | 10/2010 | Perkins et al. |
| 7,944,544 B2 | 5/2011 | Amako et al. |
| 7,961,393 B2 | 6/2011 | Perkins et al. |
| 8,009,355 B2 | 8/2011 | Nakai |
| 8,027,087 B2 | 9/2011 | Perkins et al. |
| 8,049,841 B2 | 11/2011 | Sugita et al. |
| 8,138,534 B2 | 3/2012 | Adkisson et al. |
| 8,248,697 B2 | 8/2012 | Kenmochi |
| 8,363,319 B2 * | 1/2013 | Sawaki ............... G02B 5/3058 359/485.03 |
| 8,416,371 B2 * | 4/2013 | Kumai ................ G02B 27/283 349/201 |
| 8,426,121 B2 | 4/2013 | Brueck et al. |
| 8,493,658 B2 | 7/2013 | Nishida et al. |
| 8,506,827 B2 | 8/2013 | Wu et al. |
| 8,611,007 B2 | 12/2013 | Davis |
| 8,619,215 B2 | 12/2013 | Kumai |
| 8,696,131 B2 | 4/2014 | Sawaki |
| 8,709,703 B2 | 4/2014 | Deng et al. |
| 8,755,113 B2 | 6/2014 | Gardner et al. |
| 8,804,241 B2 | 8/2014 | Wu et al. |
| 8,808,972 B2 | 8/2014 | Wang et al. |
| 8,873,144 B2 | 10/2014 | Davis |
| 8,913,321 B2 * | 12/2014 | Davis .................... B82Y 20/00 359/485.05 |
| 9,348,076 B2 * | 5/2016 | Wang ...................... G02B 1/08 |
| 9,354,374 B2 * | 5/2016 | Wang ...................... G02B 1/08 |
| 2001/0066421 | 7/2001 | Parriaux |
| 2001/0053023 A1 | 12/2001 | Kameno et al. |
| 2002/0003661 A1 | 1/2002 | Nakai |
| 2002/0015135 A1 | 2/2002 | Hansen et al. |
| 2002/0040892 A1 | 4/2002 | Koyama et al. |
| 2002/0122235 A1 | 9/2002 | Kurtz et al. |
| 2002/0167727 A1 | 11/2002 | Hansen et al. |
| 2002/0176166 A1 | 11/2002 | Schuster |
| 2002/0181824 A1 | 12/2002 | Huang et al. |
| 2002/0191286 A1 | 12/2002 | Gale et al. |
| 2003/0058408 A1 | 3/2003 | Magarill et al. |
| 2003/0072079 A1 | 4/2003 | Silverstein et al. |
| 2003/0081178 A1 | 5/2003 | Shimizu et al. |
| 2003/0081179 A1 | 5/2003 | Pentico et al. |
| 2003/0112190 A1 | 6/2003 | Ballarda et al. |
| 2003/0117708 A1 | 6/2003 | Kane |
| 2003/0142400 A1 | 7/2003 | Hansen et al. |
| 2003/0156325 A1 | 8/2003 | Hoshi |
| 2003/0161029 A1 | 8/2003 | Kurtz et al. |
| 2003/0193652 A1 | 10/2003 | Pentico et al. |
| 2003/0202157 A1 | 10/2003 | Pentico et al. |
| 2003/0218722 A1 | 11/2003 | Tsao et al. |
| 2003/0223118 A1 | 12/2003 | Sakamoto |
| 2003/0223670 A1 | 12/2003 | Nikolov et al. |
| 2003/0224116 A1 | 12/2003 | Chen et al. |
| 2003/0227678 A1 | 12/2003 | Lines et al. |
| 2004/0008416 A1 | 1/2004 | Okuno |
| 2004/0042101 A1 | 3/2004 | Wang |
| 2004/0047039 A1 | 3/2004 | Wang et al. |
| 2004/0047388 A1 | 3/2004 | Wang et al. |
| 2004/0051928 A1 | 3/2004 | Mi |
| 2004/0070829 A1 | 4/2004 | Kurtz et al. |
| 2004/0071425 A1 | 4/2004 | Wang |
| 2004/0095637 A1 | 5/2004 | Nikolov et al. |
| 2004/0120041 A1 | 6/2004 | Silverstein et al. |
| 2004/0125449 A1 | 7/2004 | Sales |
| 2004/0141108 A1 | 7/2004 | Tanaka et al. |
| 2004/0165126 A1 | 8/2004 | Ooi et al. |
| 2004/0169924 A1 | 9/2004 | Flagello et al. |
| 2004/0174596 A1 | 9/2004 | Umeki |
| 2004/0201889 A1 | 10/2004 | Wang et al. |
| 2004/0201890 A1 | 10/2004 | Crosby |
| 2004/0218270 A1 | 11/2004 | Wang |
| 2004/0227923 A1 | 11/2004 | Flagello et al. |
| 2004/0227994 A1 | 11/2004 | Ma et al. |
| 2004/0233362 A1 | 11/2004 | Kashima |
| 2004/0240777 A1 | 12/2004 | Woodgate et al. |
| 2004/0258355 A1 | 12/2004 | Wang et al. |
| 2005/0008839 A1 | 1/2005 | Cramer et al. |
| 2005/0018308 A1 | 1/2005 | Cassarley et al. |
| 2005/0045799 A1 | 3/2005 | Deng et al. |
| 2005/0046941 A1 | 3/2005 | Satoh et al. |
| 2005/0078374 A1 | 4/2005 | Tairo et al. |
| 2005/0084613 A1 | 4/2005 | Wang et al. |
| 2005/0088739 A1 | 4/2005 | Chiu et al. |
| 2005/0122587 A1 | 6/2005 | Ouderkirk et al. |
| 2005/0128567 A1 | 6/2005 | Wang et al. |
| 2005/0128587 A1 | 6/2005 | Suganuma |
| 2005/0152033 A1 | 7/2005 | Kang et al. |
| 2005/0179995 A1 | 8/2005 | Nikolov et al. |
| 2005/0180014 A1 | 8/2005 | Nikolov et al. |
| 2005/0181128 A1 | 8/2005 | Nikolov et al. |

(56) References Cited

U.S. PATENT DOCUMENTS

| | | |
|---|---|---|
| 2005/0190445 A1 | 9/2005 | Fukuzaki |
| 2005/0195485 A1 | 9/2005 | Hirai et al. |
| 2005/0201656 A1 | 9/2005 | Nikolov et al. |
| 2005/0206847 A1 | 9/2005 | Hansen et al. |
| 2005/0213043 A1 | 9/2005 | Nakashima et al. |
| 2005/0259324 A1 | 11/2005 | Flagello et al. |
| 2005/0271091 A1 | 12/2005 | Wang |
| 2005/0275944 A1 | 12/2005 | Wang et al. |
| 2005/0277063 A1 | 12/2005 | Wang et al. |
| 2006/0001969 A1 | 1/2006 | Wang et al. |
| 2006/0056024 A1 | 3/2006 | Ahn et al. |
| 2006/0061862 A1 | 3/2006 | Mi et al. |
| 2006/0072074 A1 | 4/2006 | Matsui et al. |
| 2006/0072194 A1 | 4/2006 | Lee |
| 2006/0087602 A1 | 4/2006 | Kunisada et al. |
| 2006/0092513 A1 | 5/2006 | Momoki |
| 2006/0103810 A1 | 5/2006 | Ma et al. |
| 2006/0113279 A1 | 6/2006 | Little |
| 2006/0118514 A1 | 6/2006 | Little et al. |
| 2006/0119937 A1 | 6/2006 | Perkins |
| 2006/0127829 A1 | 6/2006 | Deng et al. |
| 2006/0127830 A1 | 6/2006 | Deng et al. |
| 2006/0187416 A1 | 8/2006 | Ouchi et al. |
| 2006/0192960 A1 | 8/2006 | Renes et al. |
| 2006/0215263 A1 | 9/2006 | Mi et al. |
| 2006/0238715 A1 | 10/2006 | Hirata et al. |
| 2006/0268207 A1 | 11/2006 | Tan et al. |
| 2007/0146644 A1 | 6/2007 | Mi et al. |
| 2007/0183035 A1 | 8/2007 | Asakawa et al. |
| 2007/0195676 A1 | 8/2007 | Hendriks et al. |
| 2007/0217008 A1 | 9/2007 | Wang et al. |
| 2007/0223349 A1 | 9/2007 | Shimada et al. |
| 2007/0242187 A1 | 10/2007 | Yamaki et al. |
| 2007/0242228 A1 | 10/2007 | Chen et al. |
| 2007/0242352 A1 | 10/2007 | MacMaster |
| 2007/0297052 A1 | 12/2007 | Wang et al. |
| 2008/0037101 A1 | 2/2008 | Jagannathan et al. |
| 2008/0038467 A1 | 2/2008 | Jagannathan et al. |
| 2008/0055549 A1 | 3/2008 | Perkins |
| 2008/0055719 A1 | 3/2008 | Perkins |
| 2008/0055720 A1 | 3/2008 | Perkins |
| 2008/0055721 A1 | 3/2008 | Perkins |
| 2008/0055722 A1 | 3/2008 | Perkins |
| 2008/0055723 A1 | 3/2008 | Gardner |
| 2008/0094547 A1 | 4/2008 | Sugita et al. |
| 2008/0137188 A1 | 6/2008 | Sato et al. |
| 2008/0192346 A1 | 8/2008 | Kim et al. |
| 2008/0316599 A1 | 12/2008 | Wang et al. |
| 2009/0009865 A1 | 1/2009 | Nishida et al. |
| 2009/0040607 A1 | 2/2009 | Amako et al. |
| 2009/0041971 A1 | 2/2009 | Wang et al. |
| 2009/0053655 A1 | 2/2009 | Deng et al. |
| 2009/0109377 A1 | 4/2009 | Sawaki et al. |
| 2009/0231702 A1 | 9/2009 | Wu et al. |
| 2010/0091236 A1 | 4/2010 | Matera et al. |
| 2010/0103517 A1 | 4/2010 | Davis et al. |
| 2010/0188747 A1 | 7/2010 | Ammako et al. |
| 2010/0225832 A1 | 9/2010 | Kumai |
| 2010/0238555 A1 | 9/2010 | Amako et al. |
| 2010/0239828 A1 | 9/2010 | Cornaby |
| 2010/0328768 A1 | 12/2010 | Lines |
| 2010/0328769 A1 | 12/2010 | Perkins |
| 2011/0037928 A1 | 2/2011 | Little |
| 2011/0080640 A1 | 4/2011 | Kaida et al. |
| 2011/0096396 A1 | 4/2011 | Kaida et al. |
| 2011/0115991 A1 | 5/2011 | Sawaki |
| 2011/0235181 A1 | 9/2011 | Hayashibe et al. |
| 2012/0008205 A1 | 1/2012 | Perkins et al. |
| 2012/0075699 A1 | 3/2012 | Davis et al. |
| 2012/0086887 A1 | 4/2012 | Lee et al. |
| 2012/0206805 A1 | 8/2012 | Meng et al. |
| 2012/0250154 A1 | 10/2012 | Davis |
| 2013/0043956 A1 | 2/2013 | Salit et al. |
| 2013/0077164 A1 | 3/2013 | Davis |
| 2013/0128358 A1 | 5/2013 | Hanashima |
| 2013/0153534 A1 | 6/2013 | Resnick et al. |
| 2013/0155516 A1 | 6/2013 | Lines et al. |
| 2013/0201557 A1 | 8/2013 | Davis |
| 2013/0250411 A1 | 9/2013 | Bangerter et al. |
| 2013/0258471 A1 | 10/2013 | Davis |
| 2013/0342794 A1 * | 12/2013 | Okada .................. G02B 5/3058 349/96 |
| 2014/0300964 A1 | 10/2014 | Davis et al. |
| 2015/0077851 A1 | 3/2015 | Wang et al. |
| 2015/0116824 A1 | 4/2015 | Wang et al. |
| 2015/0116825 A1 | 4/2015 | Wang et al. |

FOREIGN PATENT DOCUMENTS

| | | |
|---|---|---|
| CN | 101688939 A | 3/2010 |
| DE | 3707984 A1 | 9/1988 |
| DE | 10327963 | 1/2005 |
| DE | 10341596 | 4/2005 |
| DE | 102004041222 | 3/2006 |
| EP | 300563 | 1/1989 |
| EP | 1347315 A1 | 9/2003 |
| EP | 2270553 | 1/2011 |
| JP | 56156815 | 12/1981 |
| JP | 58-042003 | 3/1983 |
| JP | 61122626 | 6/1986 |
| JP | 1028675 | 1/1989 |
| JP | 2308106 | 12/1990 |
| JP | 3005706 | 1/1991 |
| JP | H 03084502 | 4/1991 |
| JP | 3126910 | 5/1991 |
| JP | 04 366916 | 6/1991 |
| JP | 4331913 | 11/1992 |
| JP | 5134115 | 5/1993 |
| JP | 5288910 | 11/1993 |
| JP | 5341234 | 12/1993 |
| JP | 6138413 | 5/1994 |
| JP | H06-138413 | 5/1994 |
| JP | 06-174907 | 6/1994 |
| JP | 6202042 | 7/1994 |
| JP | 7005316 | 1/1995 |
| JP | 7072428 | 3/1995 |
| JP | 7-146469 | 6/1995 |
| JP | 07202266 | 8/1995 |
| JP | 7294850 | 11/1995 |
| JP | 7294851 | 11/1995 |
| JP | 7318861 | 12/1995 |
| JP | 9015534 | 1/1997 |
| JP | 9090122 | 4/1997 |
| JP | 9090129 | 4/1997 |
| JP | 9178943 | 7/1997 |
| JP | 9212896 | 8/1997 |
| JP | 9288211 | 11/1997 |
| JP | 10-003078 | 1/1998 |
| JP | 10073722 A | 3/1998 |
| JP | 10-153706 | 6/1998 |
| JP | 10-260403 | 9/1998 |
| JP | 10- 268301 | 10/1998 |
| JP | 11-014814 | 1/1999 |
| JP | 11-164819 | 3/1999 |
| JP | 11064794 | 3/1999 |
| JP | 11142650 | 5/1999 |
| JP | 11-174396 | 7/1999 |
| JP | 11237507 | 8/1999 |
| JP | 11-258603 | 9/1999 |
| JP | 11-306581 | 11/1999 |
| JP | 2000/147487 | 5/2000 |
| JP | 2000/284117 | 10/2000 |
| JP | 2001/074935 | 3/2001 |
| JP | 2002/116302 | 4/2002 |
| JP | 2003/502708 | 1/2003 |
| JP | 2003/207646 | 7/2003 |
| JP | 3486334 B2 | 1/2004 |
| JP | 2004/157159 | 6/2004 |
| JP | 2004/309903 | 11/2004 |
| JP | 2005/151154 | 6/2005 |
| JP | 2005/195824 | 7/2005 |
| JP | 2005/202104 A | 7/2005 |
| JP | 2005/534981 | 11/2005 |
| JP | 2006/047813 | 2/2006 |

(56) References Cited

FOREIGN PATENT DOCUMENTS

| | | |
|---|---|---|
| JP | 2006/133402 | 5/2006 |
| JP | 2006/201540 | 8/2006 |
| JP | 2006/330178 | 12/2006 |
| JP | 2007/058100 | 3/2007 |
| JP | 2007/101859 | 4/2007 |
| JP | 2011/248284 A | 12/2011 |
| KR | 2003-0079268 | 10/2003 |
| KR | 10-2003-0090021 | 11/2003 |
| KR | 10-2004-0046137 | 6/2004 |
| KR | 10-2005-0017871 | 2/2005 |
| KR | 10-0707083 | 4/2007 |
| KR | 10-2013-0024041 | 3/2013 |
| RU | 1781659 | 12/1992 |
| SU | 1283685 | 1/1987 |
| TW | 200528927 A | 1/2010 |
| WO | WO 96/15474 | 5/1996 |
| WO | WO 99/59005 | 11/1999 |
| WO | WO 00/70386 | 11/2000 |
| WO | WO 01/51964 | 7/2001 |
| WO | WO 02/21205 | 3/2002 |
| WO | WO 02/077588 | 10/2002 |
| WO | WO 03/069381 | 8/2003 |
| WO | WO 03/107046 | 12/2003 |
| WO | WO 2004/013684 | 2/2004 |
| WO | WO 2005/123277 | 12/2005 |
| WO | WO 2006/014408 | 2/2006 |
| WO | WO 2006/036546 | 4/2006 |
| WO | WO 2011/056496 | 5/2011 |

OTHER PUBLICATIONS

Auton; "Infrared Transmission Polarizers by Photolithography." Applied Optics; Jun. 1967; vol. 6, No. 6, pp. 1023-1027.
Baur; "A new type of beam splitting polarizer cube." Meadowlark Optics, 2005, pp. 1-9.
Bird et al.; "The Wire Grid as a Near-Infrared Polarizer." J. Op. Soc. Am. vol. 50 No. 9 (1960).
Brummelaar et al.; "Beam combining optical components," Chara Technical Report, Jan. 5, 1998, pp. TR61-1 to TR 61-17, No. 61.
Bruzzone et al.; "High-performance LCoS optical engine using cartesian polarizer technology;" SID 03 Digest, 2003, pp. 1-4.
Chen et al.; Novel polymer patterns formed by lithographically induced self-assembly (LISA)., American Chemical Society, Jan. 2005, pp. 818-821, vol. 21, No. 3.
Chen et al.; "Optimum film compensation modes for TN and VA LCDs." SID 98 Digest, pp. 315-318, 1998.
Dainty et al.; "Measurements of light scattering by characterized random rough surface." Waves in Random Media 3 (1991).
Deguzman et al.; "Stacked subwavelength gratings as circular polarization filters." Applied Optics, Nov. 1, 2001, pp. 5731-5737, vol. 40, No. 31.
Deng et al.; "Multiscale structures for polarization control by using imprint and UV lithography." Proc. of SPIE, 2005, pp. 1-12. vol. 6003.
Deng et al.; "Wideband antireflective polarizers based on integrated diffractive multilayer microstructures." Optics Letters, Feb. 1, 2006, pp. 344-346, vol. 31., No. 3.
DeSanto et al.; "Rough surface scattering." Waves in Random Media 1 (1991).
Enger et al.; "Optical elements with ultrahigh spatial-frequency surface corrugations." Applied Optics Oct. 15, 1983, vol. 22, No. 20 pp. 3220-3228.
Flanders; "Application of 0.100 Å linewidth structures fabricated by shadowing techniques." J. Vac. Sci. Technol., 19(4), Nov./Dec. 1981.
Flanders; "Submicron periodicity gratings as artificial anisotropic dielectrics." Appl. Phys. Lett. 42 (6), Mar. 15, 1983, pp. 492-494.
Fritsch et al.; "A liquid-crystal phase modulator for large-screen projection." IEEE, Sep. 1989, pp. 1882-1887, vol. 36, No. 9.
Glytsis et al.; "High-spatial-frequency binary and multilevel stairstep gratings: polarization-selective mirrors and broadband antireflection surfaces." Applied Optics Aug. 1, 1992 vol. 31, No. 22 pp. 4459-4470.
Haggans et al.; "Lamellar gratings as polarization components for specularly reflected beams." Journal of Modern Optics, 1993, vol. 40, No. 4, pp. 675-686.
Haisma et al.; "Mold-assisted nanolithography: a process for reliable pattern replication." Journal Vac. Sci. Technology B, Nov./Dec. 1996, pp. 4124-4128, vol. 14, No. 6.
Handbook of Optics, 1978, pp. 10-68-10-77.
Hass et al.; "Sheet Infrared Transmission Polarizers." Applied Optics Aug. 1965, vol. 4, No. 8 pp. 1027-1031.
Ho et al.; "The mechanical-optical properties of wire-grid type polarizer in projection display system." SID 02 Digest, pp. 648-651, 2002.
Knop; "Reflection Grating Polarizer for the Infrared." Optics Communications vol. 26, No. 3, Sep. 1978.
Kostal et al.; "Adding parts for a greater whole." SPIE's oeMagazine, May 2003, pp. 24-26.
Kostal et al.; "MEMS Meets Nano-optics the marriage of MEMES and nano-optics promises a new and viable platform for tunable optical filters." www.fiberoptictechnology.net, Fiber Optic Technology, Nov. 2005, pp. 8-13.
Kostal; "Nano-optic devices enable integrated fabrication." www.laserfocuswold.com, Jun. 2004 pp. 155, 157-159.
Kostal; "Nano-optics: robust, optical devices for demanding applications." Military & Aerospace Electronics, Jul. 2005, 6 pages.
Kostal; "Using advanced lithography to pattern nano-optic devices;" NanoTechnology; www.solid-state.com, Sep. 2005, p. 26 and 29.
Kuta et al.; "Coupled-wave analysis of lamellar metal transmission gratings for the visible and the infrared." J. Opt. Soc. Am. A/vol. 12, No. 5 /May 1995.
Li Li et al.; "Visible broadband, wide-angle, thin-film multilayer polarizing beam splitter." Applied Optics May 1, 1996, vol. 35, No. 13, pp. 2221-2224.
Lloyd; Manual of Advanced Undergraduate Experiments in Physics, p. 302 (1959).
Lockbihler et al.; "Diffraction from highly conducting wire gratings of arbitrary cross-section." Journal of Modern Optics, 1993, vol. 40, No. 7, pp. 1273-1298.
Lopez et al.; "Wave-plate polarizing beam splitter based on a form-birefringent multilayer grating." Optics Letters, vol. 23, No. 20, pp. 1627-1629, Oct. 15, 1998.
Maystre & Dainty; Modern Analysis of Scattering Phenomena Proceeding from International Workshop held at Domaine deTournon, Aix en Provence, France Sep. 5-8, 1990.
Moshier et al.; "The Corrosion and Passively of Aluminum Exposed to Dilute Sodium Sulfate Solutions." Corrosion Science vol. 27. No. 8 pp. 785-801; (1987).
N.M. Ceglio; Invited Review "Revolution in X-Ray Optics." J. X-Ray Science & Tech. 1; pp. 7-78 (1989).
Nordin et al.; "Micropolarizer array for infrared imaging polarimetry." J. Op. Soc. Am. A. vol. 16 No. 5 , May 1999.
Novak et al.; "Far infrared polarizing grids for use at cryogenic temperatures." Applied Optics, Aug. 15, 1989/vol. 28, No. 15, pp. 3425-3427.
Optics $9^{th}$ Edition, pp. 338-339; (1980).
PCT Application No. PCT/US2012/043979; Filing date Jun. 25, 2012; Moxtek, Inc. et al.; International Search Report dated Feb. 1, 2013.
PCT Application No. PCT/US2014/045287; Filing date Jul. 2, 2014; Moxtek, Inc.; International Search Report mailed Nov. 7, 2014.
PCT Application No. PCT/US2008/055685; Filing date Mar. 3, 2008; Moxtek, Inc. et al.; International Search Report mailed Jun. 27, 2008.
PCT Application No. PCT/US2014/053083; Filing date Aug. 28, 2014; Moxtek, Inc.; International Search Report mailed Dec. 8, 2014.
PCT Application No. PCT/US2014/053161; Filing date Aug. 28, 2014; Moxtek, Inc.; International Search Report mailed Dec. 8, 2014.

(56) References Cited

OTHER PUBLICATIONS

PCT Application No. PCT/US2014/053216; Filing date Aug. 28, 2014; Moxtek, Inc.; International Search Report mailed Dec. 8, 2014.

Pentico et al.; "New, High Performance, Durable Polarizers for Projection Displays." SID 01 Digest, 2001, pp. 1287-1289.

Richter et al.; "Design considerations of form birefringent microstructures." Applied Optics, vol. 34, No. 14, pp. 2421-2429, May 10, 1995.

Savas et al.; "Achromatic interferometric lithography for 100-nm-period gratings and grids." Journal Vac. Sci. Technology B, Nov./Dec. 1995, pp. 2732-2735, vol. 13, No. 6.

Scandurra et al.; "Corrosion Inhibition of Al Metal in Microelectronic Devices Assemble in Plastic Packages." Journal of the Electrochemical Society, 148 (8) B289-B292 (2001).

Sonek et al.; "Ultraviolet grating polarizers." J. Vac. Sci. Technol., 19(4), Nov./Dec. 1981, pp. 921-923.

Takano et al.; "Cube polarizers by the use of metal particles in anodic alumina films." Applied Optics, vol. 33, No. 16, 3507-3512, Jun. 1, 1994.

Tyan et al.; "Polarizing beam splitter based on the anisotropic spectral reflectivity characteristic of form-birefringent multilayer gratings." Optics Letters, May 15, 1996, pp. 761-763, vol. 21, No. 10.

Tyan et al.; "Design, fabrication, and characterization of form-birefringent multilayer polarizing beam splitter." Optical Society of America, vol. 14, No. 7, pp. 1627-1636, Jul. 1997.

U.S. Appl. No. 13/937,433, filed Jul. 9, 2013; Paul Steven Mills.

Wang et al.; "Diffractive optics: nanoimprint lithography enables fabrication of subwavelength optics." LaserFocusWorld, http://lfw.pennnet.com/Articles/Article_Dispaly.cf . . . Apr. 19, 2006, 6 pages.

Wang et al.; "Fabrication of a new broadband waveguide polarizer with a double-layer 190 nm period metal-gratings using nanoimprint lithography." Journal Vac. Sci. Technology B, Nov./Dec. 1999, pp. 2957-2960, vol. 17, No. 6.

Wang et al.; "High-performance large-area ultra-broadband (UV to IR) nanowire-grid polarizers and polarizing beam-splitters." Proc. of SPIE 2005, pp. 1-12, vol. 5931.

Wang et al.; "High-performance nanowire-grid polarizers" Optical Society of America. 2005, pp. 195-197, vol. 30, No. 2.

Wang et al.; "Monolithically integrated isolators based on nanowire-grid polarizers." IEEE, Photonics Technology Letters, Feb. 2005, pp. 396-398, vol. 17, No. 2.

Wang, et al.; "Innovative High-Performance Nanowire-Grid Polarizers and integrated Isolators," IEEE Journal of Selected Topics in Quantum Electronics, pp. 241-253, vol. 11 No. 1 Jan./Feb. 2005.

Wang et al.; "Free-Space nano-optical devices and integration: design, fabrication, and manufacturing." Bell Labs Technical Journal, 2005 pp. 107-127, vol. 10, No. 3.

Whitbourn et al.; "Phase shifts in transmission line models of thin periodic metal grids." Applied Optics Aug. 15, 1989 vol. 28, No. 15, pp. 3511-3515.

Zhang et al.; "A broad-angle polarization beam splitter based on a simple dielectric periodic structure." Optics Express, Oct. 29, 2007, 6 pages, vol. 15, No. 22.

\* cited by examiner

WIRE GRID POLARIZER WITH SIDE REGION

CLAIM OF PRIORITY

This claims priority to U.S. Provisional Patent Application Nos. 61/924,569, filed on Jan. 7, 2014, 61/924,560, filed on Jan. 7, 2014, 61/895,225, filed on Oct. 24, 2013, which are hereby incorporated herein by reference in their entirety.

FIELD OF THE INVENTION

The present application is related generally to wire grid polarizers.

BACKGROUND

Wire grid polarizers may be used for polarizing light, by allowing one polarization of light to pass through the polarizer, and reflecting or absorbing an opposite polarization of light. For simplicity, the polarization that primarily passes through the polarizer will be referred to as p-polarized light and the polarization that primarily is reflected or absorbed will be referred to as s-polarized light. Goals of wire grid polarizer design include increasing transmission of p-polarized light, decreasing transmission of s-polarized light, and increasing reflection or absorption of s-polarized light. Different applications have different requirements.

The goals of increasing transmission of p-polarized light and decreasing transmission of s-polarized light are common to most or all applications. There can be a trade-off between these two. In other words, certain designs that may increase transmission of p-polarized light may also undesirably increase transmission of s-polarized light. Other designs that decrease transmission of s-polarized light may also undesirably decrease transmission of p-polarized light.

For some applications, it is desirable to reflect as much s-polarized light as possible. For example, if s-polarized light is primarily reflected, then the optical system can effectively utilize both the transmitted p-polarized light and the reflected s-polarized light. It can be important in such designs to increase reflection of s-polarized light without reducing transmission of p-polarized light. Sometimes there is a trade-off in a particular design between increasing transmission of p-polarized light and increasing reflection of s-polarized light.

For other applications, absorption of s-polarized light may be preferred. Absorption of s-polarized light may be preferred if the reflection of light can disrupt the image or other intended use. For example, in a transmissive panel image projection system, reflected light may go back into the LCD imager causing image degradation, or stray light can reach the screen, degrading contrast. An ideal selectively absorptive wire grid polarizer will transmit all p-polarized light and selectively absorb all s-polarized light. In reality, some s-polarized light is transmitted and some reflected and some p-polarized light is absorbed and some reflected. Sometimes there is a trade-off in a particular design between increasing transmission of p-polarized light and increasing absorption of s-polarized light.

The effectiveness of a wire grid polarizer can thus be quantified by (1) high transmission of p-polarized light; (2) high absorption or reflection of s-polarized light, depending on the design; and (3) high contrast. Contrast is equal to percent of p-polarized light transmitted (Tp) divided by percent of s-polarized light transmitted (Ts): Contrast=Tp/Ts.

It can be important in wire grid polarizers for infrared, visible, and ultraviolet light to have small wires with small pitch, such as nanometer or micrometer size and pitch, for effective polarization. Typically, a pitch of less than half of the wavelength of light to be polarized is needed for effective polarization. Smaller pitches may improve the contrast. Thus, small pitch can be an important feature of wire grid polarizers. Manufacture of wire grid polarizers with sufficiently small pitch is challenging, and is a goal of research in this field.

Small wires can be damaged by handling and by environmental conditions. Protection of the wires can be important in wire grid polarizers. Durability of wire grid polarizers is thus another important feature.

For example, see U.S. Pat. Nos. 5,991,075, 6,288,840, 6,665,119, 7,630,133, 7,692,860, 7,800,823, 7,961,393, and 8,426,121; U.S. Patent Publication Numbers US 2008/0055723, US 2009/0041971, and US 2009/0053655; U.S. patent application Ser. No. 13/326,566, filed on Dec. 15, 2011; "Application of 100 Å linewidth structures fabricated by shadowing techniques" by D. C. Flanders in J. Vac. Sci. Technol., 19(4), November/December 1981; and "Submicron periodicity gratings as artificial anisotropic dielectrics" by Dale C. Flanders in Appl. Phys. Lett. 42 (6), 15 Mar. 1983, pp. 492-494.

SUMMARY

It has been recognized that it would be advantageous to provide a durable wire grid polarizer with high transmission of p-polarized light, high contrast, and small pitch. High absorption or high reflection of s-polarized light, depending on the design, can also be important. The present invention is directed to various embodiments of wire grid polarizers having multiple regions, which can include a central region and side region(s), and methods of making wire grid polarizers, which satisfy these needs. Each of the various embodiments may satisfy one or more of these needs.

In one embodiment, the wire grid polarizer can comprise a substrate that is substantially transmissive to incoming light with an array of parallel, elongated first lower ribs disposed over the substrate. The first lower ribs can have a bottom attached to the substrate, a top surface opposite the bottom, and two opposite sides. An array of parallel, elongated, first upper ribs can be disposed over the top surface of the first lower ribs such that each first lower rib is paired with a corresponding first upper rib to define an array of center ribs or a central region. The wire grid polarizer can also comprise an array of elongated side bars including a side bar disposed along each side of each of the center ribs. A side region can include the side bars. There can be a gap between a side bar and corresponding center rib and an adjacent side bar and corresponding center rib.

At least one of the first lower ribs, first upper ribs, and side bars can be reflective of incoming light A first method of making a wire grid polarizer can comprise:
1. providing a substrate:
   a. that is substantially transmissive to incoming light; and
   b. having a continuous thin film of material over a surface of the substrate;
2. etching the substrate and the thin film to form:
   a. an array of parallel, elongated center ribs disposed over the substrate, the center ribs comprising lower first lower ribs and first upper ribs; and
   b. solid-material-free gaps between the ribs;

3. conformal coating the substrate and the center ribs with a layer of material while maintaining solid-material-free gaps between the ribs; and
4. etching the layer of material to remove horizontal segments and leaving vertical side bars along sides of the center ribs.

A second method of making a wire grid polarizer can comprise
1. providing a substrate, that is substantially transmissive to incoming light, and an array of parallel, elongated first lower ribs disposed over the substrate;
2. conformal coating the substrate and the first lower ribs with a layer of material while maintaining solid-material-free first gaps between the first lower ribs;
3. etching the layer of material to remove horizontal segments and leaving vertical side bars along sides of the first lower ribs;
4. backfilling the first gaps and continuing to fill above the first lower ribs and the side bars with fill material, the fill material having similar etch properties with the first lower ribs;
5. etching the fill material and the first lower ribs below a top of the side bars forming solid-material-free second gaps between tops of the side bars and forming second lower ribs between the side bars on a same plane as the first lower ribs; and
6. backfilling the second gaps and continuing to fill above the side bars with upper material.

Figure 16:
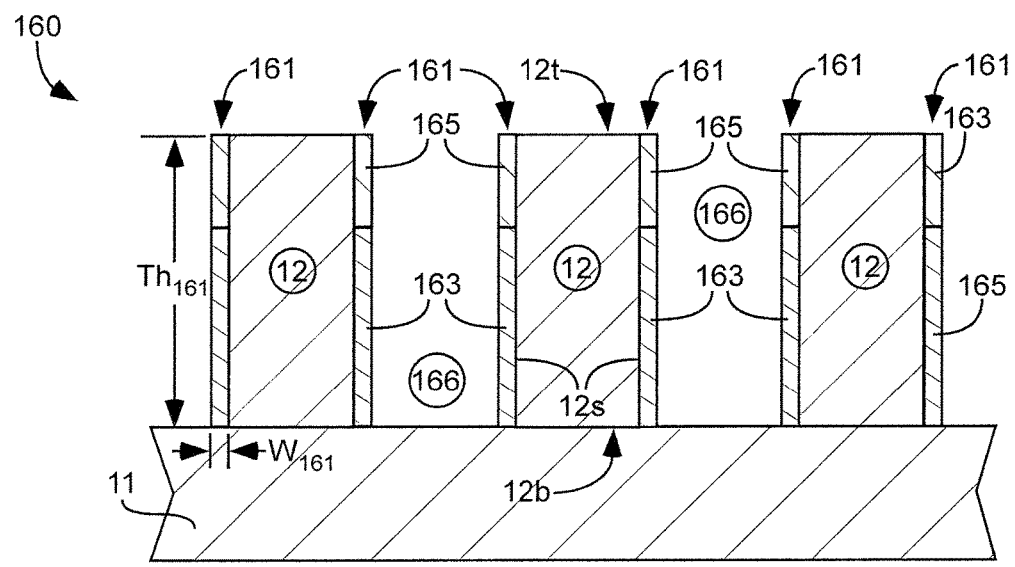
FIG. 16 is a schematic cross-sectional side view of a wire grid polarizer 160 including elongated strips 161 disposed along each side 12s of first lower ribs 12, the strips 161 comprising lower wires 163 and upper wires 165, in accordance with an embodiment of the present invention.
Figure 17:
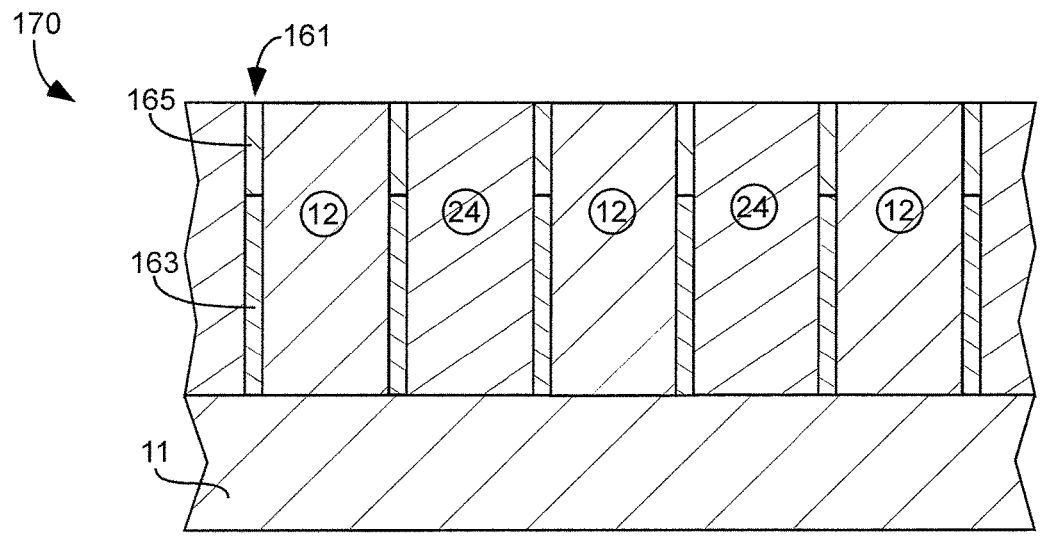
Figure 18:
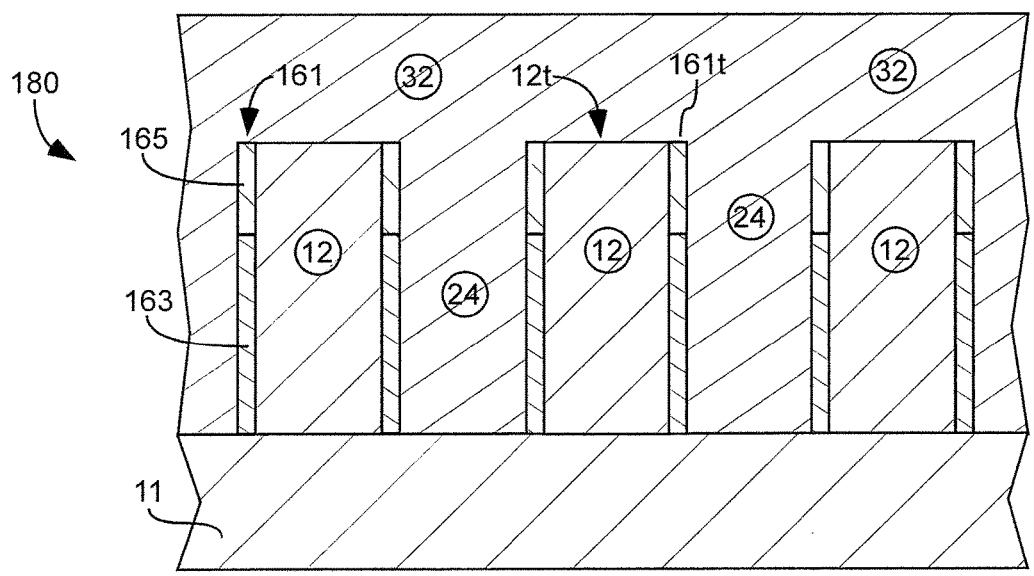
Figure 19:
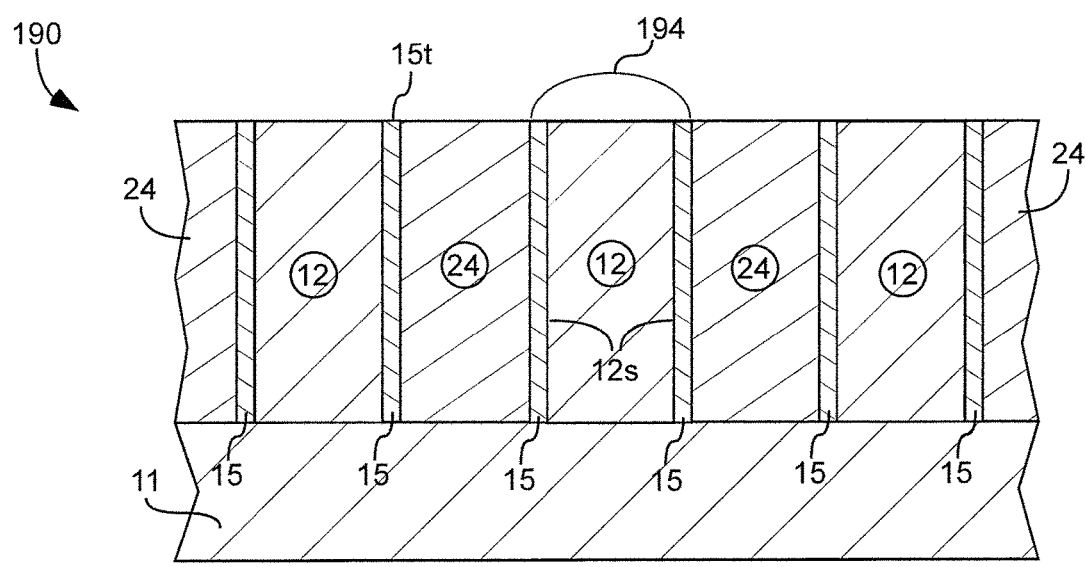

FIG. 17 is a schematic cross-sectional side view of a wire grid polarizer 170, similar to wire grid polarizer 160 of FIG. 16, with side ribs 24 substantially filling gaps 166 between the first lower rib 12—strip 161 structures, in accordance with an embodiment of the present invention;

FIG. 18 is a schematic cross-sectional side view of a wire grid polarizer 180, similar to wire grid polarizer 170 of FIG. 17, but also including dielectric material 32 extending from the gaps 16 above and over tops 12t of the first lower ribs 12 and the strips 161, in accordance with an embodiment of the present invention; and FIG. 19 is a schematic cross-sectional side view of a wire grid polarizer 190 including side-by-side first lower ribs 12, side bars 15, and side ribs 24 with a side bar 15 between each first lower rib 12 and each side rib 24, in accordance with an embodiment of the present invention.

REFERENCE NUMBERS IN THE DRAWINGS

10 wire grid polarizer
11 substrate
12 first lower rib
12b bottom of the first lower rib 12
12t top surface of the first lower rib 12
12s side of the first lower rib 12
13 first upper rib
13t top of the first upper rib 13
14 center rib
14s side 14s of the center rib 14
15 side bar
15br bottom region of the side bar 15
15t top the side bar 15
15tr top region of the side bar 15
16 gap between each side bar 15 and corresponding center rib 14 and an adjacent side bar 15 and corresponding center rib 15
20 wire grid polarizer
24 side rib
30 wire grid polarizer
32 dielectric material
40 wire grid polarizer
42 second lower rib
43 second upper rib
53 thin film
71 horizontal segment
75 layer of material
96 first gap
122 fill material
136 second gap
143 upper material
160 wire grid polarizer
161 strip
161t top of the strip 161
163 lower wire
165 upper wire
166 gaps between the strips 161
170 wire grid polarizer
180 wire grid polarizer
190 wire grid polarizer
194 central group
d depth of etch below a top 15t of the side bars 15
H height
$Th_{13}$ upper rib 13 and 43 thickness
$Th_{15}$ side bar 15 thickness
$Th_{161}$ strip 161 thickness $W_{15}$ side bar 15 width
$W_{75}$ layer of material 75 width
$W_{161}$ strip 161 width

DEFINITION

Many materials used in optical structures absorb some amount of light, reflect some amount of light, and transmit some amount of light. The following definitions are intended to distinguish between materials or structures that are primarily absorptive, primarily reflective, or primarily transmissive.

1. As used herein, the term "absorptive" means substantially absorptive of light in the wavelength of interest.
   a. Whether a material is "absorptive" is relative to other materials used in the polarizer. Thus, an absorptive structure will absorb substantially more than a reflective or a transmissive structure.
   b. Whether a material is "absorptive" is dependent on the wavelength of interest. A material can be absorptive in one wavelength range but not in another.
   c. In one aspect, an absorptive structure can absorb greater than 40% and reflect less than 60% of light in the wavelength of interest (assuming the absorptive structure is an optically thick film—i.e. greater than the skin depth thickness).
   d. Absorptive ribs can be used for selectively absorbing one polarization of light.
2. As used herein, the term "reflective" means substantially reflective of light in the wavelength of interest.
   a. Whether a material is "reflective" is relative to other materials used in the polarizer. Thus, a reflective structure will reflect substantially more than an absorptive or a transmissive structure.
   b. Whether a material is "reflective" is dependent on the wavelength of interest. A material can be reflective in one wavelength range but not in another. Some wavelength ranges can effectively utilize highly reflective materials. At other wavelength ranges, especially lower wavelengths where material degradation is more likely to occur, the choice of materials may be more limited and an optical designer may need to accept materials with a lower reflectance than desired.
   c. In one aspect, a reflective structure can reflect greater than 80% and absorb less than 20% of light in the wavelength of interest (assuming the reflective structure is an optically thick film—i.e. greater than the skin depth thickness).
   d. Metals are often used as reflective materials.
   e. Reflective wires can be used for separating one polarization of light from an opposite polarization of light.
3. As used herein, the term "transmissive" means substantially transmissive to light in the wavelength of interest.
   a. Whether a material is "transmissive" is relative to other materials used in the polarizer. Thus, a transmissive structure will transmit substantially more than an absorptive or a reflective structure.
   b. Whether a material is "transmissive" is dependent on the wavelength of interest. A material can be transmissive in one wavelength range but not in another.
   c. In one aspect, a transmissive structure can transmit greater than 90% and absorb less than 10% of light in the wavelength of interest.
4. As used in these definitions, the term "material" refers to the overall material of a particular structure. Thus, a structure that is "absorptive" is made of a material that as a whole is substantially absorptive, even though the material may include some reflective or transmissive components. Thus for example, a rib made of a sufficient amount of absorptive material so that it substantially absorbs light is an absorptive rib even though the rib may include some reflective or transmissive material embedded therein.

5. As used herein, the term "light" can mean light or electromagnetic radiation in the x-ray, ultraviolet, visible, and/or infrared, or other regions of the electromagnetic spectrum.

6. As used herein, the term "substrate" includes a base material, such as for example a glass wafer. The term "substrate" includes a single material, and also includes multiple materials, such as for example a glass wafer with at least one thin film on a surface of the wafer used together as the base material.

DETAILED DESCRIPTION

Figure 1:
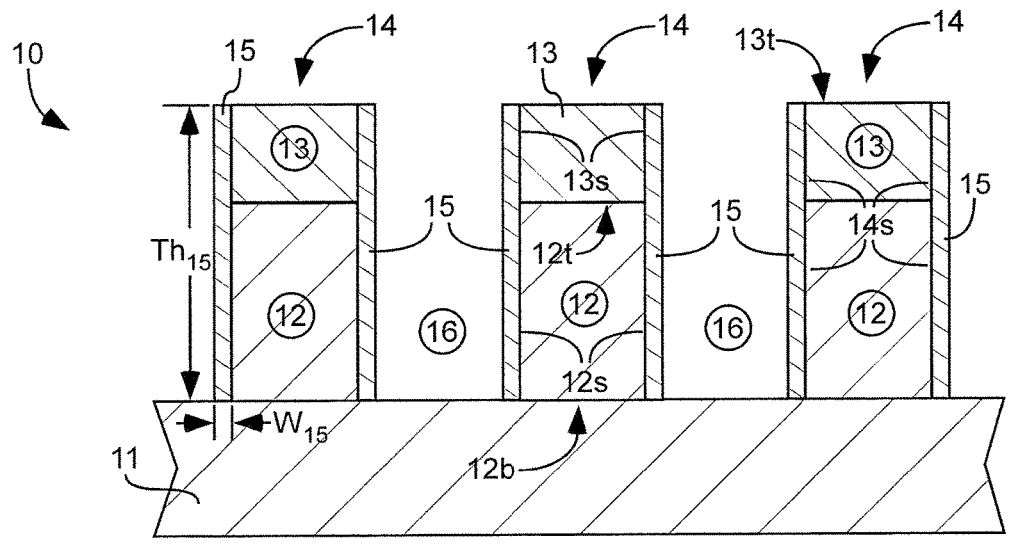
FIG. 1 is a schematic cross-sectional side view of a wire grid polarizer 10 including (1) center ribs 14 comprising first lower ribs 12 and first upper ribs 13 and (2) side bars 15 disposed along each side of each of the center ribs 14, in accordance with an embodiment of the present invention.

First Structure Group (FIGS. 1-4):

As illustrated in FIG. 1, a wire grid polarizer 10 is shown comprising an array of parallel, elongated first lower ribs 12 disposed over a substrate 11. The first lower ribs 12 can have a bottom 12b attached to the substrate 12, a top surface 12t opposite the bottom 12b, and two opposite sides 12s. The first lower ribs 12 can be integral with, and can be formed of the same material as, the substrate 11. Alternatively, the first lower ribs 12 can be formed of a different material than the substrate 11. The substrate 11 can be substantially transmissive to incoming light.

The first lower ribs 12 can be substantially absorptive of incoming light, substantially reflective of incoming light, or substantially transmissive to incoming light or of a desired wavelength range of light. The first lower ribs 12 can comprise or can consist of a dielectric material, a metal, or other material. Whether the first lower ribs 12 are substantially absorptive, substantially transmissive, or substantially reflective can depend on overall polarizer structure and intended use.

An array of parallel, elongated, first upper ribs 13 can be disposed over the top surface 12t of the first lower ribs 12. The first upper ribs 13 can have sides 13s that are substantially parallel with sides 12s of the first lower ribs 12. The first lower ribs 12 and/or the first upper ribs 13 can be called or can be part of a central region. Each first lower rib 12 can be paired with a corresponding first upper rib 13 to define an array of center ribs 14.

The first upper ribs 13 can comprise or can consist of a dielectric material, a metal, or other material. The first upper ribs 13 can be substantially absorptive, substantially reflective, or substantially transmissive of incoming light or of a desired wavelength range of light. Whether the first upper ribs 13 are substantially absorptive, substantially transmissive, or substantially reflective can depend on overall polarizer structure and intended use.

The wire grid polarizer 10 can further comprise an array of elongated side bars 15, including a side bar 15 disposed along each side 14s of each of the center ribs 14. Thus, a pair of side bars 15 can sandwich and can adjoin a center rib disposed between the pair. The side bars 15 can extend along each side 14s of the center ribs 14 substantially from the bottom 12b of the first lower ribs 12 to a top 13t of the first upper ribs 13. The side bars 15 can be substantially absorptive, substantially transmissive, or substantially reflective to incoming light. The side bars 15 can comprise or can consist of a dielectric material, a metal, or other material. Whether the side bars 15 are substantially absorptive, substantially transmissive, or substantially reflective can depend on overall polarizer structure and intended use.

There can be a gap 16 between each side bar 15 and corresponding center rib 14 and an adjacent side bar 15 and corresponding center rib 14. The gaps 16 can allow each side bar 15 to act individually and thus to affect one light polarization (e.g. s-polarization) differently than another light polarization (e.g. p-polarization). Having solid-material-free gaps can improve transmission of p-polarized light (increase Tp) in some designs.

At least one of the first lower ribs 12, first upper ribs 13, and side bars 15 can be substantially reflective of incoming light. At least one of the first lower ribs 12, first upper ribs 13, and side bars 15 can be substantially absorptive to incoming light. At least one of the first lower ribs 12, first upper ribs 13, and side bars 15 can be substantially transmissive of incoming light.

Figure 2:
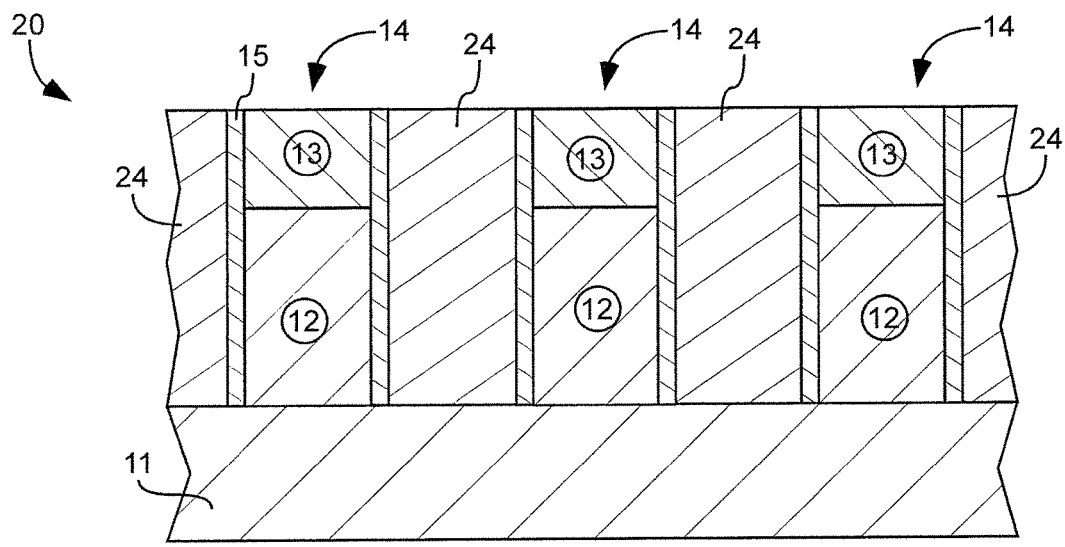
FIG. 2 is a schematic cross-sectional side view of a wire grid polarizer 20, similar to the wire grid polarizer 10 of FIG. 1, with side ribs 24 substantially filling gaps 16 between the combined center rib 14—side bar 15 structure, and also illustrating a step in the first method for making a wire grid polarizer, in accordance with embodiments of the present invention.

As shown on wire grid polarizer 20 in FIG. 2, side ribs 24 can be disposed in the gaps 16. The side ribs 24 can substantially fill the gaps 16. A side region can include the side ribs 24 and/or the side bars 15.

The side ribs 24 can be formed by spinning on a liquid that can harden upon evaporation of an included solvent. For example, spin-on a liquid glass in a solvent, then bake out the solvent. Another method is applying multiple layers by use of atomic layer deposition (ALD). Then, the material that was added, such as by ALD or spin on, can be etched down to form separate side ribs 24 in each gap 16.

At least one of the first lower ribs 12, first upper ribs 13, side bars 15, and side ribs 24 can be substantially reflective of incoming light. At least one of the first lower ribs 12, first upper ribs 13, side bars 15, and side ribs 24 can be substantially absorptive to incoming light. At least one of the first lower ribs 12, first upper ribs 13, side bars 15, and side ribs 24 can be substantially transmissive of incoming light.

Figure 3:
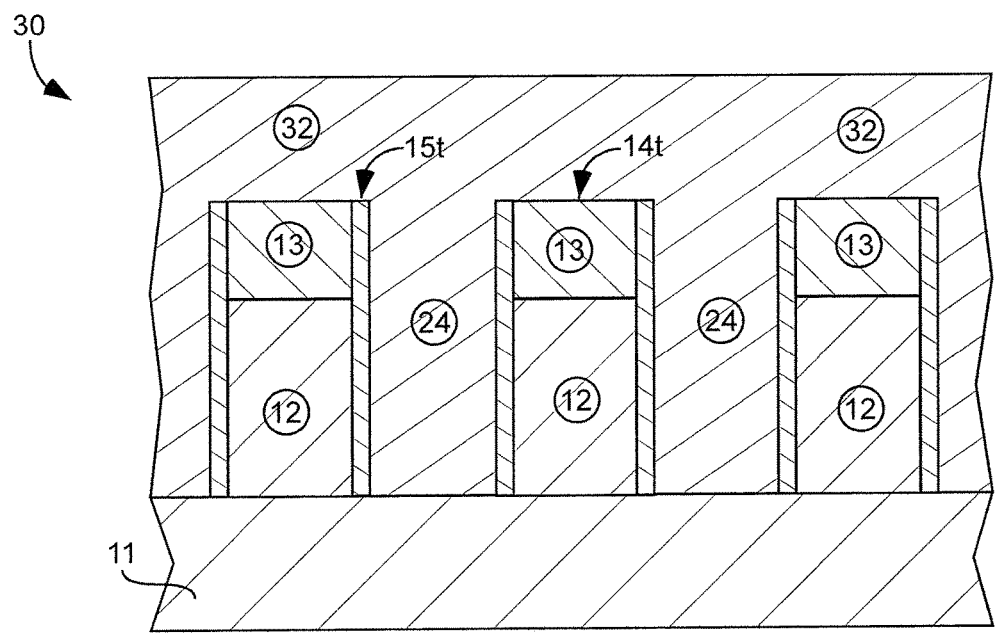
FIG. 3 is a schematic cross-sectional side view of a wire grid polarizer 30, similar to the wire grid polarizer 20 of FIG. 2, but also including dielectric material 32 extending from the gaps 16 above and over tops of the center ribs 14 and the side bars 15, and also illustrating a step in the first method for making a wire grid polarizer, in accordance with embodiments of the present invention.

As shown on wire grid polarizer 30 in FIG. 3, a dielectric material 32 can extend above and over tops 14t of the center ribs 14 and over tops 15t the side bars 15. The dielectric material 32 can be the same material as that of the side ribs 24 and thus can extend from the gaps 16 over tops 14t of the center ribs 14 and over tops 15t the side bars 15. The dielectric material 32 can be formed during the same manufacturing step as that of formation of the side ribs 24 or the dielectric material 32 can be added above the side ribs 24 after their formation, such as by chemical or physical vapor deposition. If dielectric material 32 is the same material as that of the side ribs 24, then this dielectric material 32 can be added, such as by spin-on or ALD for example, but not etched down to form separate side ribs 24.

Figure 4:
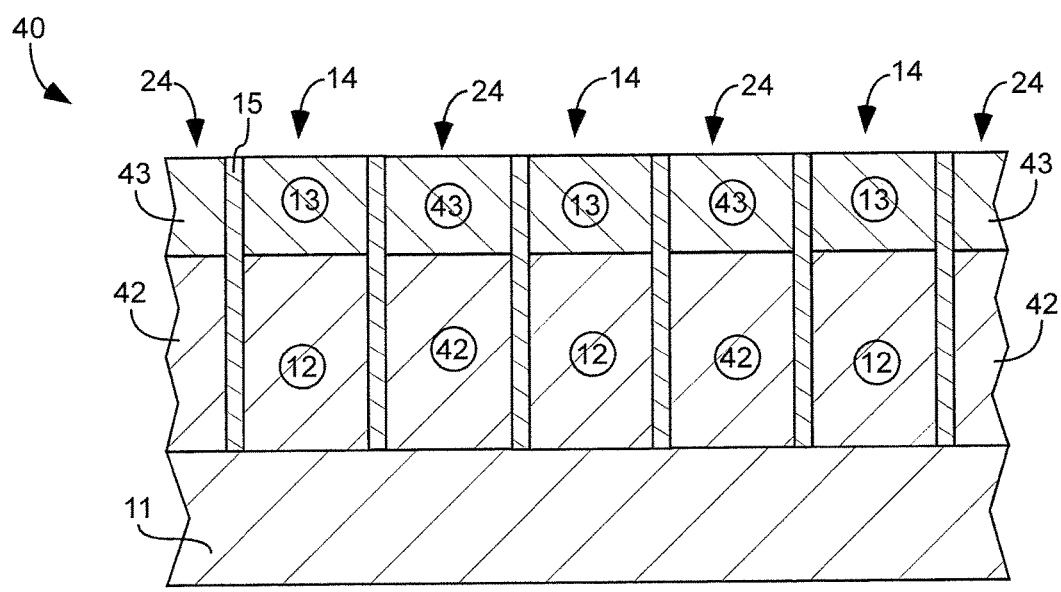
FIG. 4 is a schematic cross-sectional side view of a wire grid polarizer 40, similar to the wire grid polarizer 20 of FIG. 2, wherein the side ribs 24 comprise second lower ribs 42 and second upper ribs 43 and the side bars 15 separate the first lower ribs 12 from the second lower ribs 42 and the first upper ribs 13 from the second upper ribs 43, in accordance with an embodiment of the present invention.

As shown on wire grid polarizer 40 in FIG. 4, the side ribs 24 can comprise second upper ribs 43 disposed over the second lower ribs 42. The second lower ribs 42 can be disposed adjacent to the substrate 11. The side bars 15 can separate the first lower ribs 12 from the second lower ribs 42 and the first upper ribs 13 from the second upper ribs 43.

The second upper ribs 43 can be substantially absorptive, substantially reflective, or substantially transmissive to incoming light. The second upper ribs 43 can comprise or can consist of a dielectric material, a metal, or other material. Whether the second upper ribs 43 are substantially absorptive, substantially transmissive, or substantially reflective can depend on overall polarizer structure and intended use.

In one embodiment, one of the second lower ribs 42 or second upper ribs 43 can be substantially transmissive to incoming light and the other can be substantially absorptive of incoming light. In another embodiment, one of the second lower ribs 42 or second upper ribs 43 can be substantially reflective and the other can be substantially transmissive or substantially absorptive of incoming light.

First Method—Applicable to the First Structure Group (FIGS. 1-4):

The wire grid polarizers 10, 20, 30, and 40 shown in FIGS. 1-4 can be made by some or all of the following steps in this First Method:

1. Providing a substrate 11 (see FIG. 5):
   a. The substrate can be substantially transmissive to incoming light. In methods of making described herein, the term "substrate" can be a single material or can be multiple layers of materials, such as for example a glass wafer with at least one thin film on a surface of the wafer.
   b. The substrate can have a continuous thin film 53 of material over a surface of the substrate. The film may be applied by various methods including chemical vapor deposition or physical vapor deposition. The thin film 53 can be a dielectric material, a metal, or other material. The thin film 53 can be substantially transmissive, substantially reflective, or substantially absorptive of incoming light depending on desired use of the polarizer, other materials of polarizer construction, and overall polarizer design.
2. Etching the substrate 11 and the thin film 53 to form (see FIG. 6):
   a. an array of parallel, elongated center ribs 14 disposed over the substrate 11, the center ribs 14 comprising first upper ribs 13 disposed over first lower ribs 12; and
   b. solid-material-free gaps 16 between the ribs 14.

Figure 5:
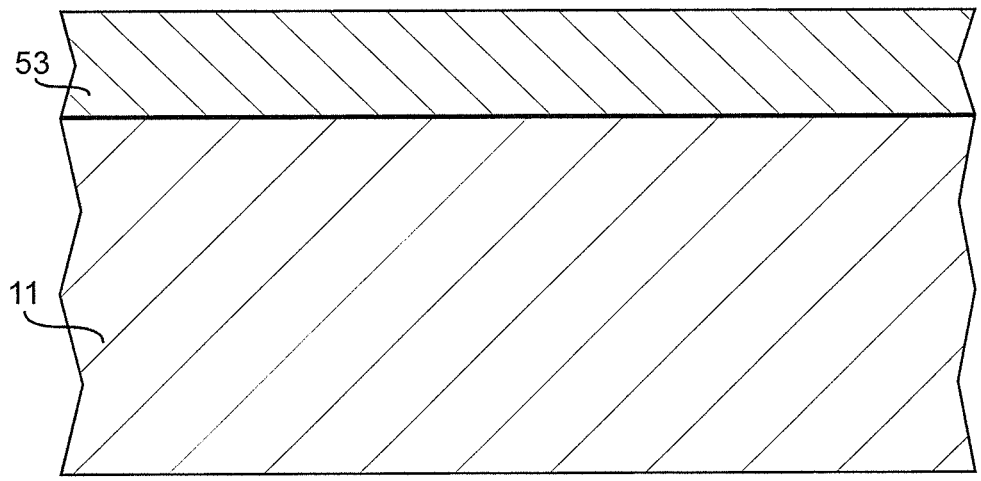
FIG. 5 is a schematic cross-sectional side view of a of step in a first method for making a wire grid polarizer—providing a substrate 11 that is substantially transmissive to incoming light and applying a continuous thin film of material 53 over a surface of the substrate 11—in accordance with an embodiment of the present invention.
Figure 6:
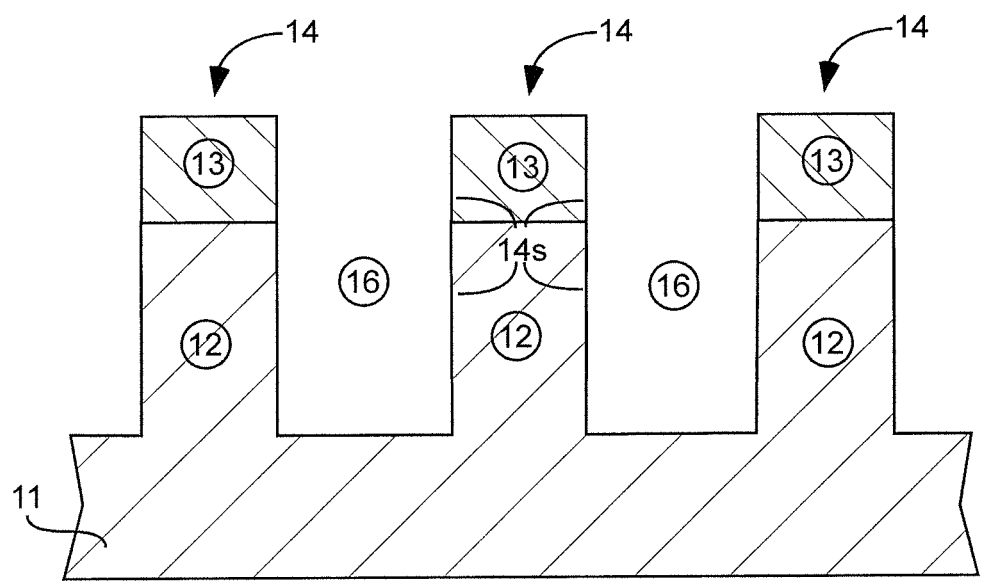
FIG. 6 is a schematic cross-sectional side view of a of step in the first method for making a wire grid polarizer—etching the substrate 11 and the thin film 53 to form (a) an array of parallel, elongated center ribs 14 disposed over the substrate 11 and (b) solid-material-free gaps 16 between the center ribs 14—in accordance with an embodiment of the present invention.

The first lower ribs 12 in FIG. 6 can be a different material than the substrate 11 in FIG. 6 if the original substrate shown in FIG. 5 was a substrate with a layer of material on top and the first lower ribs 12 were etched into this top layer. For example, if the substrate 11 originally was silicon dioxide with a layer of titanium dioxide, and the etch went through the titanium dioxide layer, then the remaining substrate 11 could be silicon dioxide and the first lower ribs 12 could be only titanium dioxide or an upper titanium dioxide region and a lower silicon dioxide region.

Figure 7:
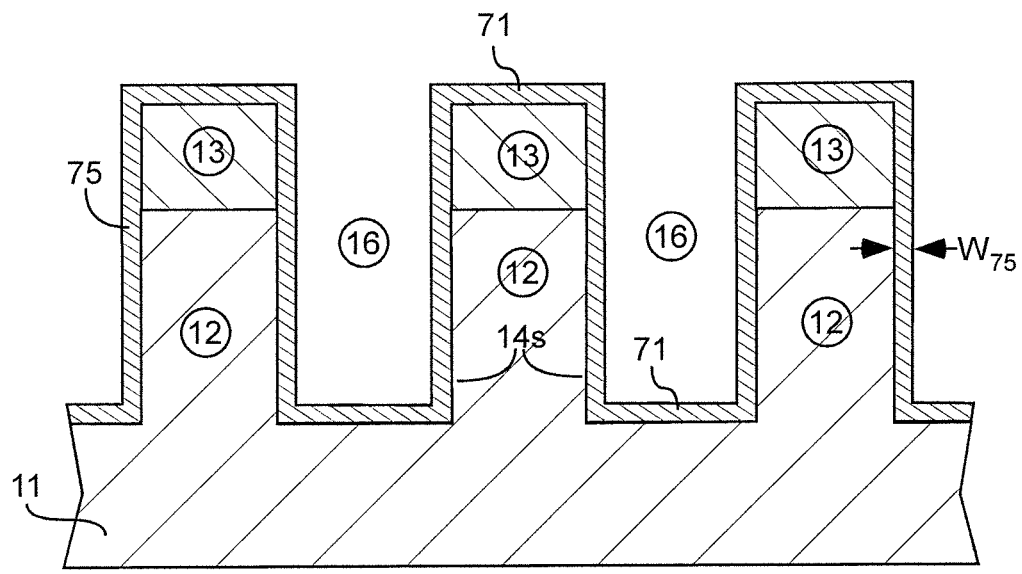
FIG. 7 is a schematic cross-sectional side view of step 3 of the first method for making a wire grid polarizer—conformal coating the substrate 11 and the center ribs 14 with a layer of material 75 while maintaining solid-material-free gaps 16 between the center ribs 14—in accordance with an embodiment of the present invention.

3. Conformal coating (e.g. atomic layer deposition) the substrate 11 and the center ribs 14 with a layer of material 75 while maintaining the solid-material-free gaps 16 between the ribs 14 (see FIG. 7). Note that "maintaining the solid-material-free gaps 16" means that there can remain a solid-material-free region between the first lower ribs 12, but of course the gaps 16 will be reduced in size by the added layer of material 75. The layer of material 75 can be the desired material of the final side bars 15 described in step 4.
4. Etching the layer of material 75 to remove horizontal segments 71 and leaving vertical side bars 15 along sides of the center ribs 14 (see FIGS. 7-8). The etch can be an anisotropic etch in order to remove horizontal segments 71 while leaving the vertical side bars 15.

The following steps 5-6 can be done for improved wire grid polarizer durability or to otherwise affect polarizer performance.

5. Backfilling the gaps 16 forming side ribs 24 (see FIG. 2).
   a. Backfilling can be done by spinning on a liquid that can harden upon evaporation of an included solvent. For example, spin on a liquid glass in a solvent, then bake out the solvent. Other backfilling methods may be used, such as for example applying multiple layers by use of atomic layer deposition (ALD).
   b. The structure of FIG. 2 may be formed by backfilling above the center ribs 14 and side bars 15 with desired material of the side ribs 24 then etching down to tops of the center ribs 14 and side bars 15, thus forming the separate side ribs 24.
6. Backfilling above the center ribs 14 and side bars 15 with dielectric material 32 (see FIG. 3).
   a. The dielectric material 32 can be the same material as, or different from, that of the side ribs 24.
   b. If the dielectric material 32 is the same material as that of the side ribs 24, then it can be applied in the same manufacturing step as filling the gaps 16. For example, a liquid material can both fill the gaps 16 and above the center ribs 14, then the liquid may be heated to cure and harden.
   c. If the dielectric material 32 is a different material than the side ribs 24, then chemical vapor deposition or physical vapor deposition can be used for applying this layer of dielectric material 32 above the center ribs 14 and the side ribs 24.
   d. If the dielectric material 32 will be part of the final polarizer, then it may be preferred to use a transmissive dielectric material because a continuous layer of absorptive dielectric material can undesirably increase absorption of p-polarized light.

In one aspect, the above steps can be performed in the order shown. All steps may not be required. For example, the process could end at the end of step 4 if side ribs 24 and dielectric material 32 are not desired.

Figure 9:
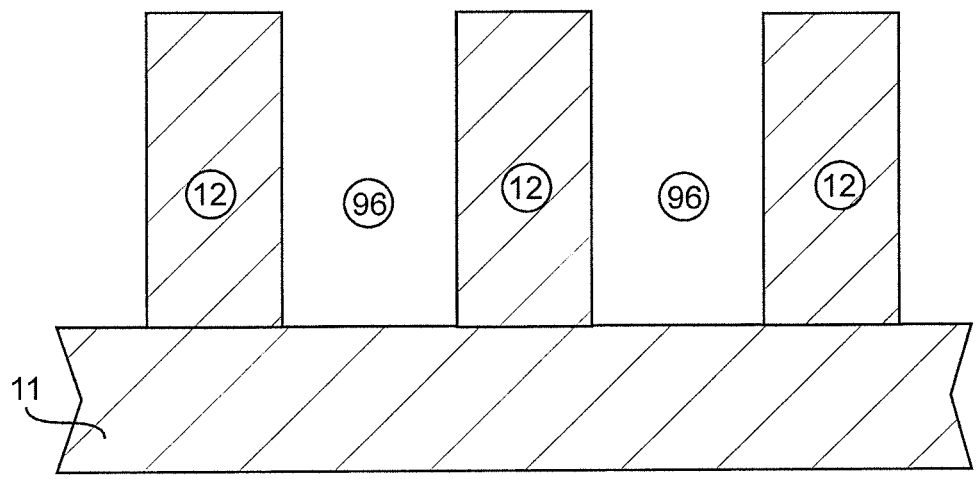
FIG. 9 is a schematic cross-sectional side view of a of step in a second method for making a wire grid polarizer—providing a substrate 11 having an array of parallel, elongated first lower ribs 12 disposed over the substrate 11—in accordance with an embodiment of the present invention.
Figure 10:
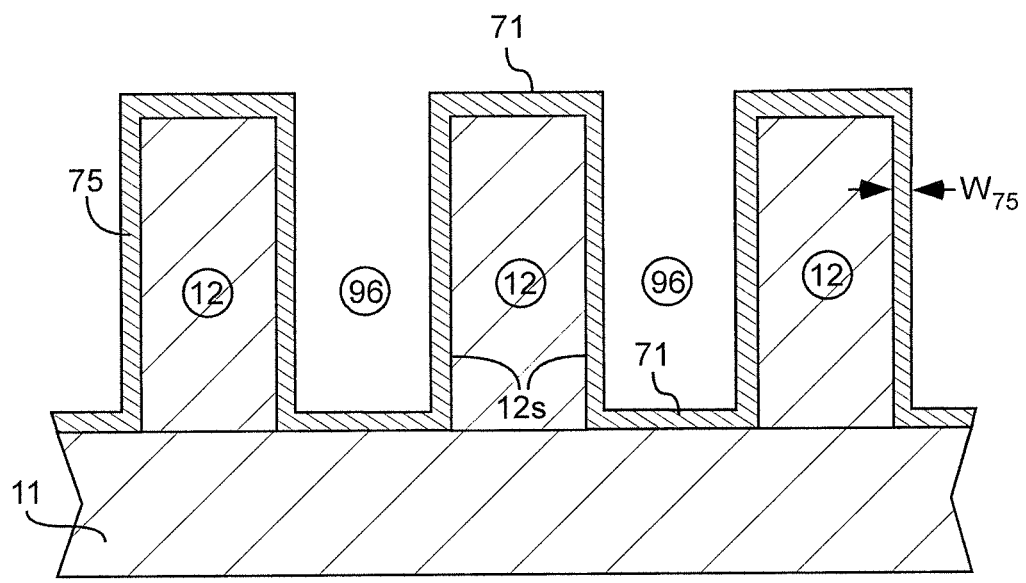
FIG. 10 is a schematic cross-sectional side view of a of step in the second method for making a wire grid polarizer—conformal coating the substrate 11 and the first lower ribs 12 with a layer of material 75 while maintaining solid-material-free first gaps 96 between the first lower ribs 12—in accordance with an embodiment of the present invention.
Figure 11:
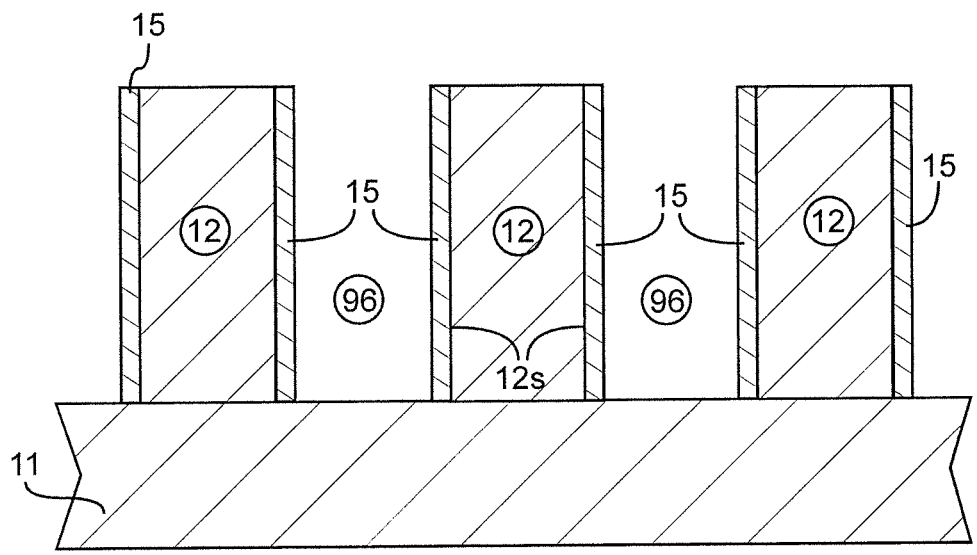
FIG. 11 is a schematic cross-sectional side view of a of step in the second method for making a wire grid polarizer—etching the layer of material 75 to remove horizontal segments 71 and leaving vertical side bars 15 along sides 12s of the first lower ribs 12—in accordance with an embodiment of the present invention.

Second Method—Applicable to the First Structure Group (FIGS. 1-4):

The wire grid polarizers 10, 20, 30, and 40 shown in FIGS. 1-4 can be made by some or all of the following steps in this Second Method:

1. Providing a substrate 11 having an array of parallel, elongated first lower ribs 12 disposed over the substrate 11 (see FIG. 9). There can be solid-material-free first gaps 96 between the first lower ribs 12. The substrate 11 and first lower ribs 12 can have properties as described in other sections herein. The substrate 11 itself, or a layer of material on top of the substrate 11, can be patterned and etched to form the first lower ribs 12.
2. Conformal coating the substrate and the first lower ribs 12 with a layer of material 75 while maintaining the first gaps 96 between the first lower ribs 12 (see FIG. 10). Note that "maintaining the first gaps 96" means that there can remain a solid-material-free region between the first lower ribs 12, but of course the first gaps 96 will be reduced in size by the added layer of material 75. The layer of material 75 can be the desired material of the final side bars 15 described in step 3.
3. Etching the layer of material 75 to remove horizontal segments 71 and leaving vertical side bars 15 along sides of the first lower ribs 12 (see FIG. 11). The etch can be an anisotropic etch in order to remove horizontal segments 71 while leaving the vertical side bars 15.

At this point, the wire grid polarizer may be usable. The following steps can be added to create a selectively absorptive wire grid polarizer, to embed the polarizer, and/or to modify other characteristics of the polarizer.

Figure 12:
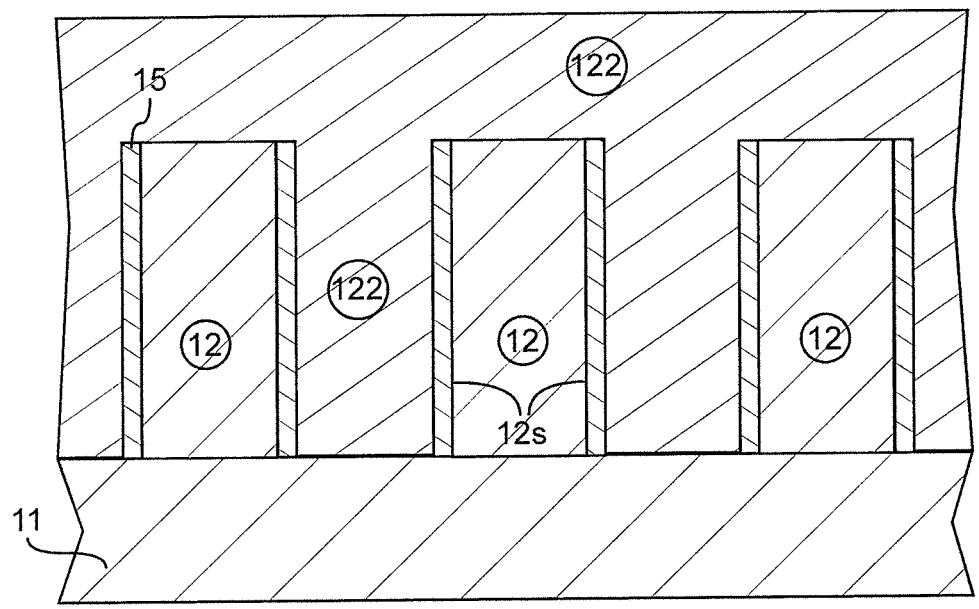
FIG. 12 is a schematic cross-sectional side view of a of step in the second method for making a wire grid polarizer—backfilling the first gaps 96 and continuing to fill above the first lower ribs 12 and the side bars 15 with fill material 122, the fill material 122 having similar etch properties with the first lower ribs 12—in accordance with an embodiment of the present invention.
Figure 13:
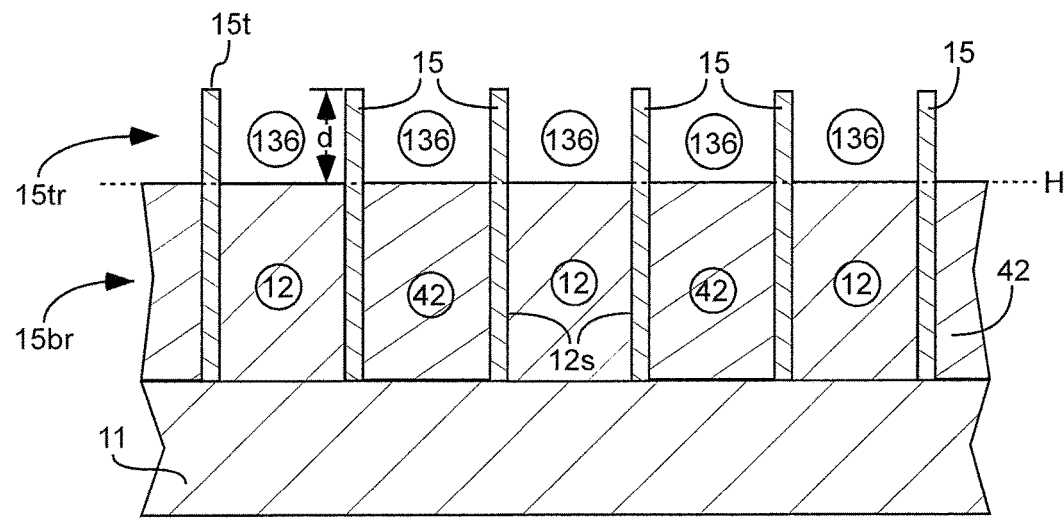
FIG. 13 is a schematic cross-sectional side view of a of step in the second method for making a wire grid polarizer—etching the fill material 122 and the first lower ribs 12 below a top 15t of the side bars 15 forming solid-material-free second gaps 136 at a top region 15tr of the side bars 15 and forming second lower ribs 42 between the side bars 15 on a same plane as the first lower ribs 12 (at a bottom region 15br of the side bars 15)—in accordance with an embodiment of the present invention.
Figure 14:
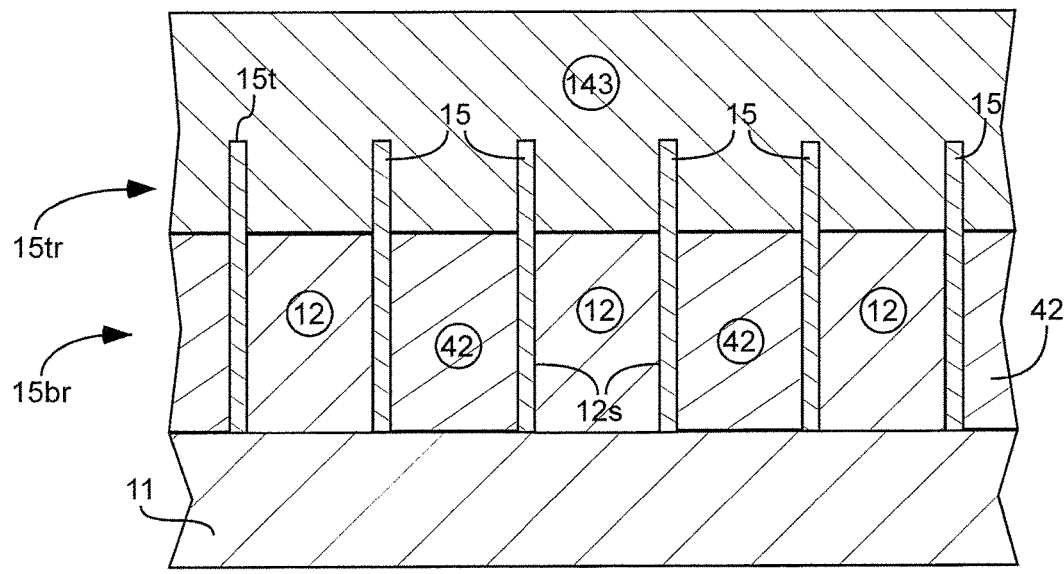
FIG. 14 is a schematic cross-sectional side view of a of step in the second method for making a wire grid polarizer—backfilling the second gaps 136 and continuing to fill above tops 15t of the side bars 15 with upper material 143—in accordance with an embodiment of the present invention.
Figure 15:
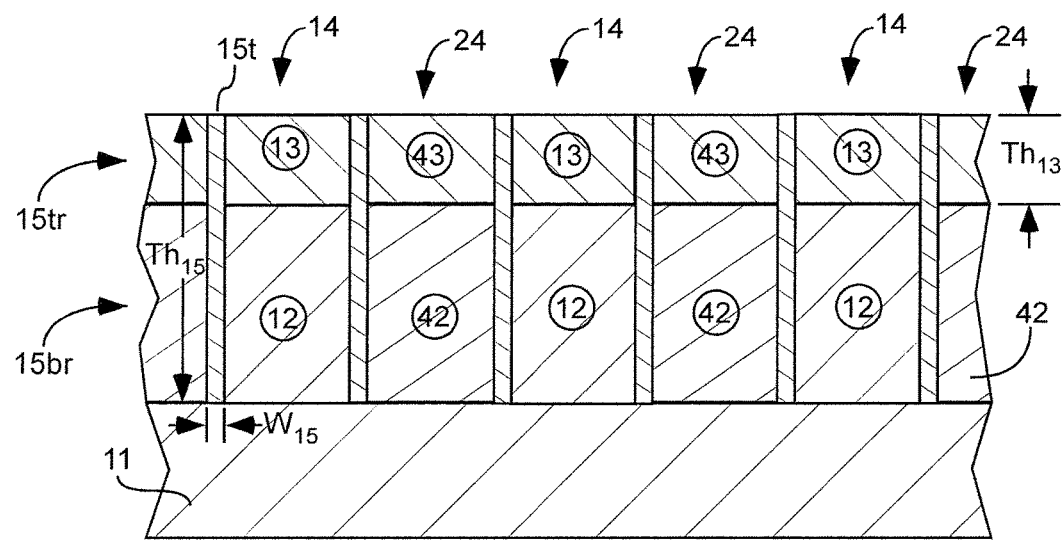
FIG. 15 is a schematic cross-sectional side view of a of step in the second method for making a wire grid polarizer—etching the upper material 143 at least down to tops 15t of the side bars 15 forming an array of parallel, elongated, upper ribs 13 and 43 above the lower ribs 12 and 42, with first upper ribs 13 over the first lower ribs 12 and second upper ribs 43 over the second lower ribs 42, and the side bars 15 separating the first lower ribs 12 from the second lower ribs 42 and the first upper ribs 13 from the second upper ribs 43—in accordance with an embodiment of the present invention.

4. Backfilling the first gaps 96 and continuing to fill above the first lower ribs 12 and the side bars 15 with fill material 122 (see FIG. 12). The fill material 122 can have similar etch properties with the first lower ribs 12. Backfilling with the fill material 122 can be done by spinning on a liquid that can harden upon evaporation of an included solvent. For example, spin on a liquid glass in a solvent, then bake out the solvent. Other backfilling methods may be used, such as for example applying multiple layers by use of atomic layer deposition (ALD).
5. Etching the fill material 122 and the first lower ribs 12 below a top 15t of the side bars 15 forming solid-material-free second gaps 136 at a top region 15tr of the side bars 15 and forming second lower ribs 42 between the side bars 15 and the first lower ribs 12 on a same plane as the first lower ribs 12 (at a bottom region 15br of the side bars 15) (see FIG. 13).
  a. An etch may be selected to preferentially etch the fill material 122 and the first lower ribs 12 with minimal etch of the side bars 15.
  b. The second lower ribs 42 can be formed in locations of the previous solid-material-free first gaps 96.
  c. The first lower ribs 12 and the second lower ribs 42 can be etched to approximately the same height H due to similar etch characteristics of the fill material 122 compared to the first lower ribs 12.
  d. The depth d of the etch below a top 15t of the side bars 15 can be approximately equivalent to a thickness $Th_{13}$ of upper ribs 13 and 43 described in the next steps. For example, the depth d of the etch below a top 15t of the side bars 15, a thickness $Th_{13}$ of the first upper ribs 13, and/or a thickness $Th_{13}$ of the second upper ribs 43 can be at least 5 nm in one aspect, at least 10 nm in another aspect, at least 25 nm in another aspect, or at least 75 nm in another aspect.
  e. The fill material 122 and the second lower ribs 42 can be a material that is substantially transmissive, substantially reflective, or substantially absorptive of incoming light.
6. Backfilling the second gaps 136 and continuing to fill above the tops 15t of the side bars 15 with upper material 143 (see FIG. 14). Backfilling can be done by a similar method as described in step 4 above.
7. Etching the upper material 143 at least down to the tops 15t of the side bars 15 forming an array of parallel, elongated, upper ribs 13 and 43 above the first lower ribs 12 and above the second lower ribs 42 (see FIG. 15). First upper ribs 13 can be disposed over the first lower ribs 12 and second upper ribs 43 over the second lower ribs 42. The side bars 15 can separate the first lower ribs 12 from the second lower ribs 42 and can separate the first upper ribs 13 from the second upper ribs 43.

In the second method, at least one of the first lower ribs 12, the second lower ribs 42, the first upper ribs 13, the second upper ribs 43, and the side bars 15 can be substantially transmissive, substantially absorptive, or substantially reflective of incoming light.

In one aspect, the above steps can be performed in the order shown. All steps may not be required. For example, the process could end at the end of step 6 if the upper material 143 need not be separated into first upper ribs 13 and second upper ribs 43.

Comparison of the First and Second Methods:

The choice of method 1 or method 2 can depend on the desired final structure, available manufacturing tools, complexity of manufacturing, and manufacturing cost.

Figure 8:
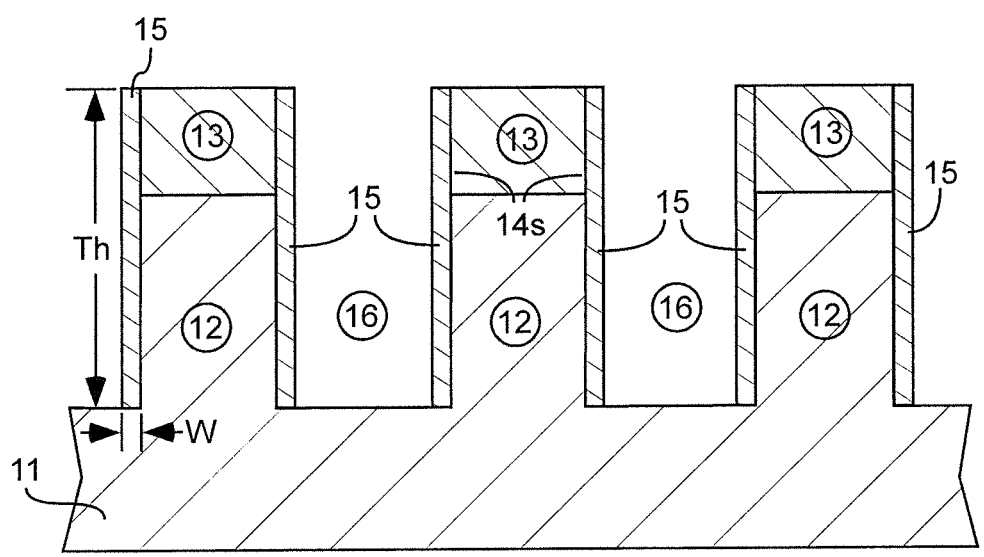
FIG. 8 is a schematic cross-sectional side view of a of step in the first method for making a wire grid polarizer—etching the layer of material 75 to remove horizontal segments 71 and leaving vertical side bars 15 along sides 14s of the center ribs 14—in accordance with an embodiment of the present invention.

Method 1 can provide a partially embedded wire grid polarizer, as shown in FIG. 8, without any backfilling step. Backfilling under method 1 may only be needed for fully embedding this structure. Method 1 can result in a structure with upper ribs that are alternating transmissive and absorptive in an upper region 15tr of the side bars 15 (as shown in FIG. 2 if one of side bars 24 or first upper ribs 13 are transmissive and the other is absorptive).

Two backfilling steps can be used in Method 2. Method 2 can result in a structure with upper ribs 13 and 43 that both are made of a single material in an upper region 15tr of the side bars 15.

Second Structure Group (FIGS. 16-18):

As illustrated in FIG. 16, a wire grid polarizer 160 is shown comprising an array of parallel, elongated first lower ribs 12 disposed over a substrate 11. The first lower ribs 12 can have a bottom 12b attached to the substrate 12, a top surface 12t opposite the bottom 12b, and two opposite sides 12s. The first lower ribs 12 can be integral with, and can be formed of the same material as, the substrate 11. Alternatively, the first lower ribs 12 can be formed of a different material than the substrate 11. The substrate 11 can be substantially transmissive to incoming light.

An elongated strip 161 can be disposed along each side 12s of the first lower ribs 12. Thus, a pair of strips 161 can sandwich and can adjoin a first lower rib 12 disposed between the pair. There can be a gap 166 between each strip 161 and corresponding first lower rib 12 and an adjacent strip 161 and corresponding first lower rib 12. The strips 161 can comprise lower wires 163 and upper wires 165.

As shown on wire grid polarizer 170 of FIG. 17, side ribs 24 can substantially fill the gaps 16. As shown on wire grid polarizer 180 of FIG. 18, dielectric material 32, which can be the same material as the side ribs 24, can extend from the gaps 166 above and over tops 12t of the first lower ribs 12 and over tops 161t of the strips 161. Alternatively, the dielectric material 32 can be a different material than the side ribs 24 and can be deposited above the side ribs 24, first lower ribs 12, and strips 161. The dielectric material 32 can have properties as described above in reference to FIGS. 2 and 3.

At least one of the upper wires 165, the lower wires 163, the side ribs 24, the first lower ribs 12, and the dielectric material 32 can comprise or can consist of a material that is substantially absorptive, substantially reflective, or substantially transmissive of incoming light. For example, in one embodiment of a polarizer for visible light, the lower wires 163 could be aluminum for polarization of incoming light, the upper wires 165 could be silicon for absorption of incoming light, and the first lower ribs 12 and the side ribs 24 could be silicon dioxide and be substantially transmissive of incoming light.

The first lower ribs 12 can define a central region. The strips 161 and/or the side ribs 24 can define side regions.

Comparison of the First Structure Group (FIGS. 1-4) to the Second Structure Group (FIGS. 16-18):

Selection of the wire grid polarizers shown in FIGS. 1-4 or the wire grid polarizers shown in FIGS. 16-18 can be made based on desired width or thickness of different regions (side bar 15 or strip 161 thickness), and manufacturability considerations. Note that the side bars 15 in FIGS. 1-4 are taller than the first lower ribs 12 in FIGS. 1-4. In comparison, the strips 161 in FIGS. 16-18 can be about the same height as the first lower ribs 12 in FIGS. 16-18, and thus the upper wires 165 and the lower wires 163 can each be shorter than the first lower ribs 12. Different applications may find one or the other of these designs to be optimal. Each design has different manufacture requirements, and thus one design may be preferable over another due to manufacturability considerations.

Third Method—Applicable to the Second Structure Group (FIGS. 16-18):

The wire grid polarizers 160, 170, and 180 shown in FIGS. 16-18 can be made by some or all of the following steps:

1. Providing a substrate 11 having an array of parallel, elongated first lower ribs 12 disposed over the substrate 11. See FIG. 9.
2. Conformal coating (such as with atomic layer deposition for example) the substrate 11 and the first lower ribs 12 with a first material while maintaining the solid-material-free first gaps 96 between the first lower ribs 12. This step is similar to the manufacturing step shown in FIG. 10.
3. Etching the first material to remove horizontal segments and leaving lower wires 163 along sides of the center ribs 14. Continuing to etch the lower wires 163 below tops 12t of the first lower ribs 12.
4. Applying a resist. Patterning to provide openings above the lower wires 163.
5. Applying a second material.
6. Etching the second material to remove horizontal segments and leaving the upper wires 165 along sides of the first lower ribs 12 and above the lower wires 163.
7. Removing the resist.

The above seven steps can be used to make the wire grid polarizer shown in FIG. 16. The side ribs 24 and the dielectric material 32 may be applied as described above under the First Method section to make one of the polarizers 170 or 180 shown in FIGS. 17-18.

Third Structure (FIG. 19):

As shown in FIG. 19, a wire grid polarizer 190 can include side-by-side first lower ribs 12, side bars 15, and side ribs 24, with a side bar 15 between each first lower rib 12 and side rib 24, and all disposed over a substrate 11 that is substantially transmissive to incoming light. In other words, an array of parallel, elongated first lower ribs 12 can be disposed over the substrate 11. The first lower ribs 12 can have two opposite sides 12s. An array of elongated side bars 15 can be disposed over the substrate 11 and can include a side bar 15 disposed along and adjoined to each side 12s of each of the first lower ribs 12. Each first lower rib 12 and accompanying pair of side bars 15 can define or can be called a central group 194. An array of elongated side ribs 24 can be disposed over the substrate 11 with a side rib 24 disposed between and adjoined to adjacent central groups 194.

At least one of the first lower ribs 12, side bars 15, and side ribs 24 can be substantially reflective, substantially absorptive, or substantially transmissive to incoming light.

Wire grid polarizer 190 can be made by steps 1-4 of the Second Method described above, then etching the fill material 122 down to tops 15t of the side bars 15 such that the side bars 15 separate first lower ribs 12 from adjacent side ribs 24.

An advantage of this wire grid polarizer 190 may be a simplified manufacturing process compared to some of the other designs described previously. A disadvantage may be fewer regions. In some designs, the additional regions may be important for wire grid polarizer function.

General Information for All Embodiments and Methods:

U.S. patent application Ser. No. 13/326,566, filed on Dec. 15, 2011, and U.S. Pat. Nos. 7,570,424 and 7,961,393, incorporated herein by reference in their entirety, provide examples of possible substrate materials, dielectric materials including absorptive dielectric materials and transmissive dielectric materials, and reflective materials. The reflective materials can also be made of a semiconductor material doped to achieve a desired level of conductivity, other types of conductors such as certain forms of carbon, or other suitable materials.

The meaning of a material being substantially absorptive, substantially reflective, or substantially transmissive of incoming light means that the material can absorb, reflect, or transmit respectively specified, desired wavelengths, or a desired wavelength range. A material can be absorptive of one wavelength range and transmissive of another wavelength range. The actual absorption, reflection, or transmission can be dependent on ionic, crystalline, and stoichiometric state of the material as well as on the overall wire grid polarizer structure.

Modeling has shown that the wire grid polarizer designs described herein can have relatively high transmission of p-polarized light and high contrast, and also can have high absorption or reflection of s-polarized light. Disposing side bars 15 or strips 161 on both sides 12s of the first lower ribs 12, can provide relatively small pitch, even with limitations of present manufacturing technology. The wire grid polarizer designs described herein also can have an advantage of at least partially embedding the side bars 15 or strips 161 (e.g. wire grid polarizers 10 and 160) or substantially or fully embedding the side bars 15 or strips 161 (e.g. wire grid polarizers 20, 30, 40, 170, 180, and 190).

Partially embedding the side bars 15 or strips 161 means that the side bars 15 or strips 161 are supported on one side, such as by the center rib 14 or first lower rib 12, but not on both sides. Thus, in a partially embedded structure, one side of the side bar 15 or strip 161 can be attached to and can be supported by the center rib 14 or first lower rib 12 and the other side can face air and not be supported. Embedding the side bars 15 and strips 161, whether fully or partially, can increase wire grid polarizer durability. The choice of a fully or partially embedded wire grid polarizer can depend on overall performance requirements of the polarizer, polarizer durability requirements (including both chemical resistance and resistance to damage by handling), and materials used.

Although embedding reflective wires of a wire grid polarizer can increase wire grid polarizer durability, embedding the reflective wires can also adversely affect wire grid polarizer performance, especially by decreasing transmission of p-polarized light (decrease Tp). Therefore, embedded wire grid polarizers have often not been implemented in practice for applications requiring high polarizer performance, such as for example in computer projectors or semiconductor analysis equipment. Modeling has shown that the specific designs described herein, although partially or completely embedded, especially combined with proper selection of side bar 15 or strip 161 aspect ratio, can provide good wire grid polarizer performance in spite of embedded, protected side bars 15 or strips 161.

For example, some embodiments of the polarizers described herein can transmit at least 90% of p-polarized light, or transmit at least 95% of p-polarized light; and can absorb at least 90% of s-polarized light, or can absorb at least 95% of s-polarized light at a selected wavelength of light (if there is at least one region with light absorbing properties). As another example, some embodiments of the polarizers described herein can transmit at least 85% of p-polarized light, or transmit at least 90% of p-polarized light; and can absorb at least 80% of s-polarized light, or can absorb at least 85% of s-polarized light at all light wavelengths from 400 nm through 700 nm (if there is at least one region with light absorbing properties).

The wire grid polarizers described herein can be made with a relatively high side bar 15 or strip 161 aspect ratio ($Th_{15}/W_{15}$ or $Th_{161}/W_{161}$). This can be done by formation of relatively tall center ribs 14 or first lower ribs 12 in relation to a width $W_{75}$ of the conformal layer of material 75 (which may approximate eventual side bar width $W_{15}$ or strip width $W_{161}$). Modeling has shown good polarization characteristics with side bar 15 or strip 161 aspect ratios of between 8 and 60. Modeling has shown good polarization characteristics in the visible spectrum with side bars 15 or strips 161 that have a width $W_{15}$ or $W_{161}$ respectively of between 5 nm and 20 nm and a thickness $Th_{15}$ of between 150 nm and 300 nm.

What is claimed is:

1. A wire grid polarizer comprising:
   a) a substrate being substantially transmissive to incoming light;
   b) an array of parallel, elongated first lower ribs disposed over the substrate, the first lower ribs having a bottom attached to the substrate, a top surface opposite the bottom, and two opposite sides;
   c) an array of parallel, elongated, first upper ribs disposed over the top surface of the first lower ribs such that each first lower rib is paired with a corresponding first upper rib to define an array of center ribs;
   d) an array of elongated side bars including a side bar disposed along each side of each of the center ribs;
   e) a gap between each side bar and corresponding center rib and an adjacent side bar and corresponding center rib, each side bar is discontinuous with respect to adjacent side bars, and each side bar is not connected to adjacent side bars by material of the side bar; and
   f) at least one of the first lower ribs, first upper ribs, and side bars is substantially reflective of incoming light.

2. The polarizer of claim 1, wherein at least one other of the first lower ribs, first upper ribs, and side bars is substantially absorptive of incoming light.

3. The polarizer of claim 1, wherein at least one other of the first lower ribs, first upper ribs, and side bars is substantially transmissive of incoming light.

4. The polarizer of claim 1, wherein the side bars extend along each side of the center ribs substantially from the bottom of the first lower ribs to a top of the first upper ribs.

5. The polarizer of claim 1, further comprising side ribs substantially filling the gaps.

6. The polarizer of claim 5, wherein the side ribs comprise a dielectric material and the dielectric material extends from the gaps above and over tops of the center ribs and the side bars.

7. The polarizer of claim 5, wherein at least one other of the first lower ribs, first upper ribs, side bars, and side ribs is substantially absorptive of incoming light.

8. The polarizer of claim 5, wherein:
   a) the side ribs comprise second upper ribs disposed over second lower ribs;
   b) one of the second lower ribs or second upper ribs is substantially transmissive of incoming light and the other of the second lower ribs or second upper ribs is substantially absorptive of incoming light; and
   c) the side bars separate the first lower ribs from the second lower ribs and the first upper ribs from the second upper ribs.

9. The polarizer of claim 1, wherein the polarizer transmits 90% of one polarization of light and absorbs 80% an opposite polarization of light at light wavelengths from 400 nm through 700 nm.

10. The polarizer of claim 1, wherein an aspect ratio of the side bars is between 8 and 60.

11. The polarizer of claim 1, wherein the side bars have a width of between 5 nm and 20 nm and a thickness of between 150 nm and 300 nm.

12. The polarizer of claim 1, wherein:
   a) at least one other of the first lower ribs, first upper ribs, and side bars is substantially absorptive of incoming light; and
   b) at least one other of the first lower ribs, first upper ribs, and side bars substantially transmissive of incoming light.

* * * * *